US009002376B2

(12) United States Patent
Price et al.

(10) Patent No.: US 9,002,376 B2
(45) Date of Patent: *Apr. 7, 2015

(54) SYSTEMS AND METHODS FOR GATHERING INFORMATION ABOUT DISCRETE WIRELESS TERMINALS

(71) Applicant: Prima Research, LLC., Denver, CO (US)

(72) Inventors: Christopher Price, Denver, CO (US); Gregory J. Beveridge, Thornton, CO (US)

(73) Assignee: Prima Research, LLC., Denver, CO (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/844,662

(22) Filed: Mar. 15, 2013

(65) Prior Publication Data

US 2014/0200023 A1 Jul. 17, 2014

Related U.S. Application Data

(63) Continuation-in-part of application No. 13/656,450, filed on Oct. 19, 2012, now Pat. No. 8,594,703, which is a continuation of application No. 12/463,138, filed on May 8, 2009, now Pat. No. 8,315,598.

(51) Int. Cl.
*H04W 24/00* (2009.01)
*H04W 64/00* (2009.01)
*G01S 5/14* (2006.01)
*H04W 48/04* (2009.01)

(52) U.S. Cl.
CPC .................. *H04W 64/00* (2013.01); *G01S 5/14* (2013.01); *H04W 48/04* (2013.01)

(58) Field of Classification Search
CPC ..... H04W 36/32; H04W 48/04; H04W 4/025; H04W 64/006
USPC ...................... 455/456.1, 456.2, 456.3, 456.6
See application file for complete search history.

(56) References Cited

U.S. PATENT DOCUMENTS

| 4,494,119 | A | 1/1985 | Wimbush |
| 2004/0203380 | A1 | 10/2004 | Hamdi |
| 2005/0192026 | A1* | 9/2005 | Carlson et al. ............ 455/456.1 |
| 2006/0166681 | A1* | 7/2006 | Lohbihler ................. 455/456.2 |
| 2006/0250305 | A1 | 11/2006 | Coluzzi |
| 2009/0140841 | A1 | 6/2009 | Meyer |

OTHER PUBLICATIONS

Robert J. Fontana and Steven J. Gunderson, Ultra-Wideband Precision Asset Location System, Proceedings IEEE Conference on Ultra Wideband Systems and Technologies, May 2002.

* cited by examiner

Primary Examiner — Khalid Shaheed
(74) Attorney, Agent, or Firm — Great Lakes Intellectual Property, PLLC.

(57) ABSTRACT

The present invention is broadly directed to systems and methods for gathering information about wireless transceiver devices in a defined boundary region. To this end, the disclosure is more particularly directed to gathering movement information (e.g., via detection and location) about two-way end-user wireless terminals within three-dimensional boundaries of defined local space ("DLS") to allow for selective control of the terminals and other subsystems, as desired. Additionally, the data collected can be used to improve accuracy and precision regarding the prediction of behavior characteristics and tendencies of populations based on a sampling of observed terminals.

20 Claims, 26 Drawing Sheets

DLS 1 = Property perimeter (Outside space) incl. surface parking
DLS 2 = Building perimeter (Total inside building space)
DLS 3 = Parking garage including "Car Finder" kiosks
DLS 4 = Tenant space monitoring as a fee service
DLS 5 = Common space incl. entrances & Food Court
DLS 6 & 7 = View corridors of display kiosks (e.g. "Smart" display ads)

SYSTEMS AND METHODS FOR GATHERING INFORMATION ABOUT DISCRETE WIRELESS TERMINALS

CROSS-REFERENCE TO RELATED APPLICATIONS

This application is a continuation-in-part of U.S. application Ser. No. 13/656,450, filed Oct. 19, 2012, which in turn is a continuation of U.S. application Ser. No. 12/463,138, filed May 8, 2009, now U.S. Pat. No. 8,315,598, the disclosures of which are incorporated in their entirety by reference herein.

TECHNICAL FIELD

The present invention relates generally to two-way wireless communications services, and more specifically to localized detection, location, and selective control of discrete two-way wireless terminals within determined three-dimensional boundaries of a defined local space ("DLS").

BACKGROUND

To artisans minimally skilled in wireless radio communication, it is well known that basic detection and subsequent location of a given continuously emitting wireless transmitter can be accomplished by merely connecting a radio receiver to one or more directional antennas and employing signal peaking methods. Such radio direction finding ("RDF") techniques have been used successfully over many years to locate ships, planes, and individuals in distress. Single-receiver techniques sometimes employ null measurements to improve the final precision of directional measurements, but such null measurements rely on adequate carrier-to-interference ratios and may also be compromised by multiple reflected signals ("multipath"). Even with the best directional antennas, single-receiver radiolocation platforms may indicate signal peaks or nulls that turn out to be from reflecting surfaces rather than the desired transmitter itself. Single-receiver techniques at best indicate that one or more transmitted signals exist within a general area without precise boundaries, due in part to the inverse-square-law asymptotic RF signal propagation characteristic of radio waves in free space.

Two-receiver radiolocation platforms provide only modest improvement over single-receiver arrangements. Multipath reflected signals from continuously emitting transmitters can significantly contribute to directional measurement error, and signal-strength boundaries remain poorly defined. Additionally, use of relative time of arrival ("RTOA") radiolocation techniques with only two synchronized receivers for locating digitally modulated RF transmitters will present nearly the same uncertainty as RDF directional measurements of continuously emitting RF transmitters. Two-receiver RTOA radiolocation platforms designed to locate such digitally modulated transmitters will, at best, predict which "disk" of circular area coordinates are possible for a given pair of RTOA values, with the disk being perpendicular to an imaginary line drawn between the two receivers, with the same poor definition of outer signal-strength boundaries.

Three-receiver synchronized radiolocation platforms with RTOA techniques for locating digitally modulated transmitters begin to offer the possibility of improved precision in both location and boundaries definition, in two dimensions only. The physical position of the three synchronized receivers defines the plane of the included two-dimensional area. Transmitters perpendicular to either side of the included two-dimensional plane will reintroduce increasing measurement error, with the same poor definition of outer signal-strength boundaries.

There are several group behavior sampling methods widely used in market research, traffic/crowd analysis and control, retail property management, and similar applications. Typical methods include various combinations of visible human observers, video systems, counting devices, portable scanners linked to a computer system, and similar technologies, to name a few. For group behavior sampling, most existing methods suffer from a relatively low sample rate, observation periods that may or may not coincide with periods of significant changes in behavior, the undesirable effect of the observer's presence influencing behavior in some way that contaminates measurement, and the scope being typically limited to one or just a few points of observation. Observation performed by an individual or a team can be "spotted" or out-maneuvered. Additionally, multiple observers face the challenge of coordinating observations to avoid duplication or other errors that could contaminate the accuracy, precision (or both) of the end result.

Current methods for tracking individuals suffer from many of the same limitations of typical methods used to sample group behavior in defined environments. Additionally, use of so-called intrusive "tracking" devices raises issues of permission, privacy intrusion and potential legal hurdles.

Secure access to buildings and other types of sensitive property typically requires physical keys/access cards that must be produced, distributed and recovered (or electronically disabled) from individuals. Unauthorized copies of keys and access cards can often be made without knowledge and permission of the issuing entity, and multiple levels of security with traditional secure access methods are often mutually exclusive. Taken together, such limitations can effectively obviate actual secure access and virtually always impose high administrative costs for what often turns out to be a relatively low level of actual security.

Certain businesses and other DLS facilities such as theaters, restaurants and churches have attempted to effect "quiet zone" environments by posting notices and/or verbally requesting customers or members to switch off or silence such terminal devices during their presence in the facility. Other facility operators have been reported to engage in the use of illegal "jamming" devices that effectively interdict all wireless terminal devices within facility premises. This method has the additional perverse effect of totally denying electronic access to certain exempt customers or members such as doctors or emergency services personnel, who may need to be instantly notified in the event of medical emergencies and threats to life or property. In this particular scenario, attempts at outgoing communication sessions would also be completely denied because the "jammed" wireless terminal would be unable to initially establish the required two-way session through the overhead "handshaking" protocol of the particular service. Absent some notice by the facility operator, interdiction by illegal jamming techniques would not likely be obvious to visitors with wireless terminals—the wireless terminal device would simply be non-functional without one's knowledge.

The limitations of present methods typically employed in sampling group behavior, tracking individuals, providing secure access, and controlling two-way wireless terminal alerts and operation are generally known by the operators of various DLSs and other entities. Certain methods, while extremely effective (i.e., "jamming"), have the distinct drawbacks of being illegal and/or denying electronic access to critical personnel without their knowledge. As such, a need exists for systems and methods to effectively and legally overcome such limitations in DLS environments. A particular need exists for systems and methods which overcome known limitations of certain applications and enable new services and features not anticipated by current wireless service delivery platforms or other approaches. To this end, systems and methods are desired which realize one or more of the following advantages: improved sampling precision; reduction of sampling inaccuracy; elimination of personal privacy intrusion; improved secure facility access at lower administrative cost; selective local control of two-way wireless terminal alerts and operation within the DLS; automatic control of DLS systems or subsystems such as security cameras; and remote control of systems and subsystems outside DLS boundaries.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention summarized above and defined by the enumerated claims below may be better understood by referring to the following detailed description, which should be read in conjunction with the accompanying drawings. This detailed description of the exemplary embodiments is not intended to limit the enumerated claims, but to serve as particular examples thereof. In addition, the phraseology and terminology employed herein is for the purpose of description, and not limitation.

Figure 1:
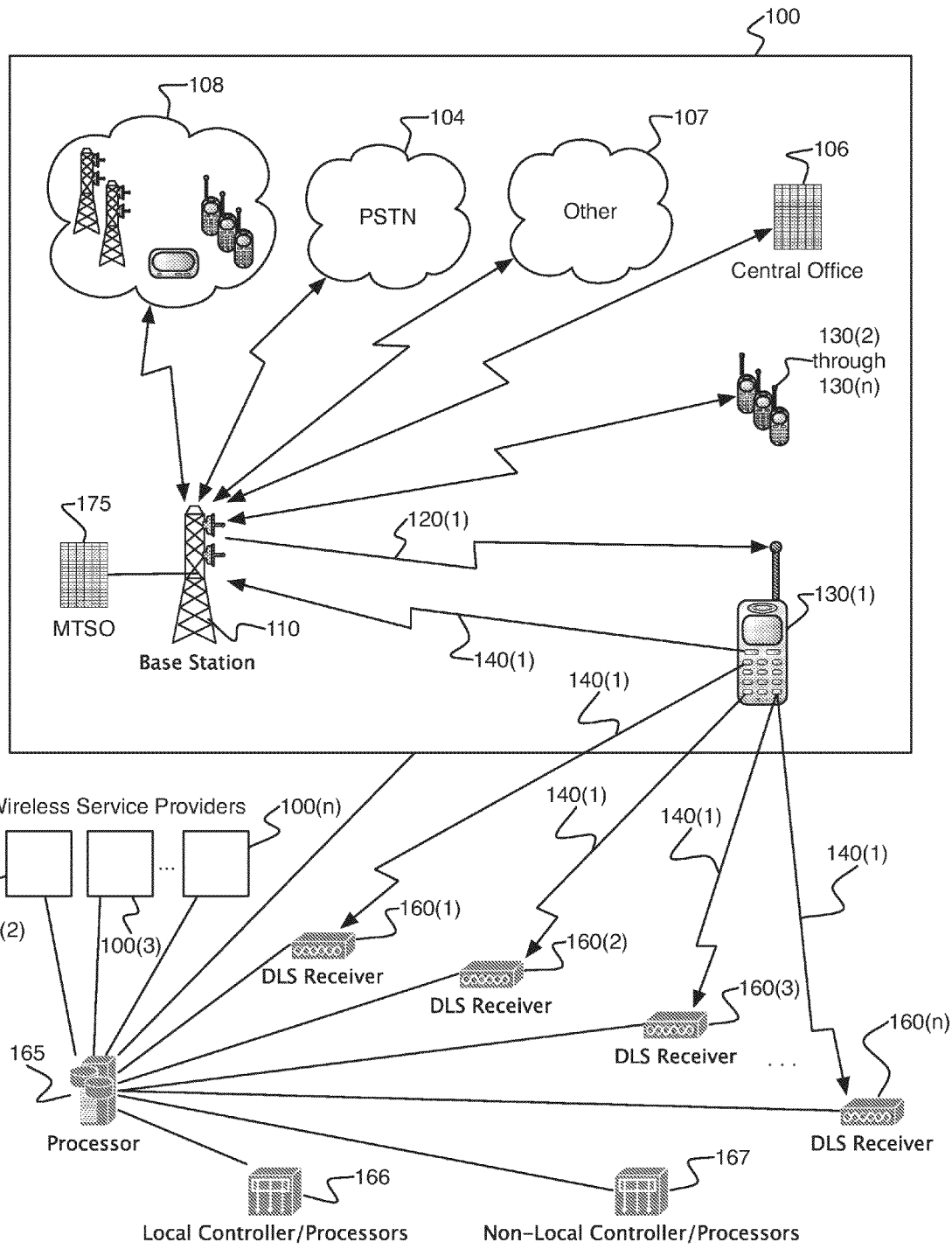
FIG. 1 is a diagrammatic depiction of a typical wireless communications network architecture, also referred to as a wireless communications system, for practicing aspects of the present invention.

With the above in mind, initial reference is now made to FIG. 1 which illustrates a wireless communication network architecture, in the form of a typical cellular telephone wireless service provider system 100, which may be used to practice aspects of the present invention. System 100 includes a base station 110 that transmits routine communication continuity "ping" or request signals 120(1) to two-way wireless terminal 130(1). Base station 110 is typically a cellular or other similar wireless radio frequency (RF) transceiver base station known by those skilled in the art. Base station 110 is also typically in communication, via a wireless or wired coupling, through none, one, or more base stations, cells, or other devices 108, to a switching station or central office 106, and, in turn, to the public switched telephone network (PSTN) 104 or other data network 107.

Base station 110 typically uses an RF overhead signaling channel to establish, supervise, and terminate voice or data communication sessions with two-way wireless terminals 130(1)-13(n) in system 100. Using the overhead RF channel, base Station 110 is typically in automatic repetitive two-way contact with each two-way wireless terminal 130(1)-13(n) within the serving area of system 100, performing a variety of administrative functions in the overhead RF spectrum, such as authentication, verification, detection of illegal "cloned" cell phones, identification of "roaming" users, and assessing the point at which a given active communication session needs to be handed off to the next cell in the system 100.

Request or ping signal 120(1) is transmitted in the overhead RF channel. Signal 120(1) modulates the RF link by using various modulation techniques, including, for example, Time Division Multiple Access (TDMA), Code Division Multiple Access (CDMA), Coded Orthogonal Frequency Division Multiplexing (COFDM), GSM, G3, the disclosures of which are hereby incorporated by reference in their entireties, and other similar modulation techniques well known to those skilled in the art. As also known in the art, signal 120(1) includes an identifier, flag, or other information 122(1) that is unique to a particular end user two-way wireless terminal, such as representative wireless terminal 130(1) in FIG. 1. As such, end user two-way wireless terminal 130(1) can discern that the request or ping signal 120(1) is for that particular end user two-way wireless terminal 130(1), as opposed to other two-way wireless terminals 130(2)-13(n) on the system 100.

Each end user two-way wireless terminal 130 may be, for example, a cellular telephone, pager, PDA, BlackBerry, or other similar wireless voice, data or multi-media communication device. Such two-way wireless terminals routinely emit RF return path signals toward base stations, even when no information communications session is in progress. In the event that two-way wireless terminal 130(1) is on and operational, upon receipt of request or ping signal 120(1), two-way wireless terminal 130(1) transmits an associated reply in the form of an automatic return signal 140(1) back to base station 110. Return signal 140(1) is generally transmitted in the administrative overhead RF channel, and is typically transmitted before any notification to the end user (e.g., before the two-way wireless terminal rings or vibrates, etc., and before the request for communication is "answered" by the end user).

Return path signals contain overhead information unique to the particular two-way wireless terminal, thereby also allowing localized detection, location and indirect control of specific end-user terminals within buildings, campus locations and other types of DLS facilities. Additionally, such locally obtained return path information may be used to control other intra- and extra-DLS systems or subsystems such as surveillance cameras. Return Signal 140(1) contains a unique TID/ESN 142(1) of the two-way Wireless Terminal 130(1) that received request or Ping Signal 120(1). TID/ESN 142(1) is used by Mobile Telephone Switching Office (MTSO) 175 to process the communication request. If there is no Return Signal 140(1) (including TID/ESN 142(1)) forthcoming from two-way Wireless Terminal 130(1), MTSO 175 assumes that two-way Wireless Terminal 130(1) is either switched off, not operational, and/or out of RF range of System 100. In such case, the calling party may be routed to voice mail, or to a standard network recording, depending on defined service option.

Although return signal 140(1) with the embedded TID/ESN 142(1) is intended for receipt only by base station 110 and MTSO 175 in system 100, it is also possible for other devices near two-way wireless terminal 130(1) to also receive return signal 140(1), typically in the RF spectrum. Thus, in accordance with the present invention, an array of synchronized DLS receivers, generally 160(1)-16(n) also receive return signal 140(1), and obtain the TID/ESN 142(1) information unique to two-way wireless terminal 130(1) within the DLS through decoding by processor 165 for the purpose of recovering TID/ESN 142(1) from return signal 140(1).

Synchronized DLS receivers 160(1)-16(n) are programmed to recognize terminal-specific TID/ESN 142(1)-142(n) transmitted from multiple two-way wireless terminals 130(1)-13(n) associated with multiple wireless technologies, within the DLS. Processor 165 associated with multiple synchronized DLS receivers 160(1)-16(n) detects, time stamps, determines exact intra-DLS physical location and prepares dynamic database for possible uploads to respective wireless service provider system 100, or other systems for active two-way wireless terminals 130 within DLS boundaries.

Processor 165 may be electromagnetically connected to a plurality of respective wireless service provider systems 100(2)-10(n) that have an RF "presence" within the DLS. Even for applications that do not involve indirect control of two-way wireless terminals 130, user-aware features and functions such as "silent" ringing or the on/off state of the terminal device, a given application may require an increased ping rate, perhaps to improve the precision of radiolocation within the DLS. Such increase in ping rate could be effected by uploading TID/ESN 142 information detected within a DLS to respective wireless service provider systems 100. If standard ping rate from wireless service provider systems 100 is satisfactory for the application and no indirect control of a two-way wireless terminal 130 is required, no communication from the DLS to associated system is required. Finally, and as also illustrated in FIG. 1, processor 165 may also be electromagnetically connected to DLS local controllers/processors 166 and non-local (remote) controllers/processors 167 to control systems and subsystems such as secure facility access, security cameras and the like.

Figure 2A:
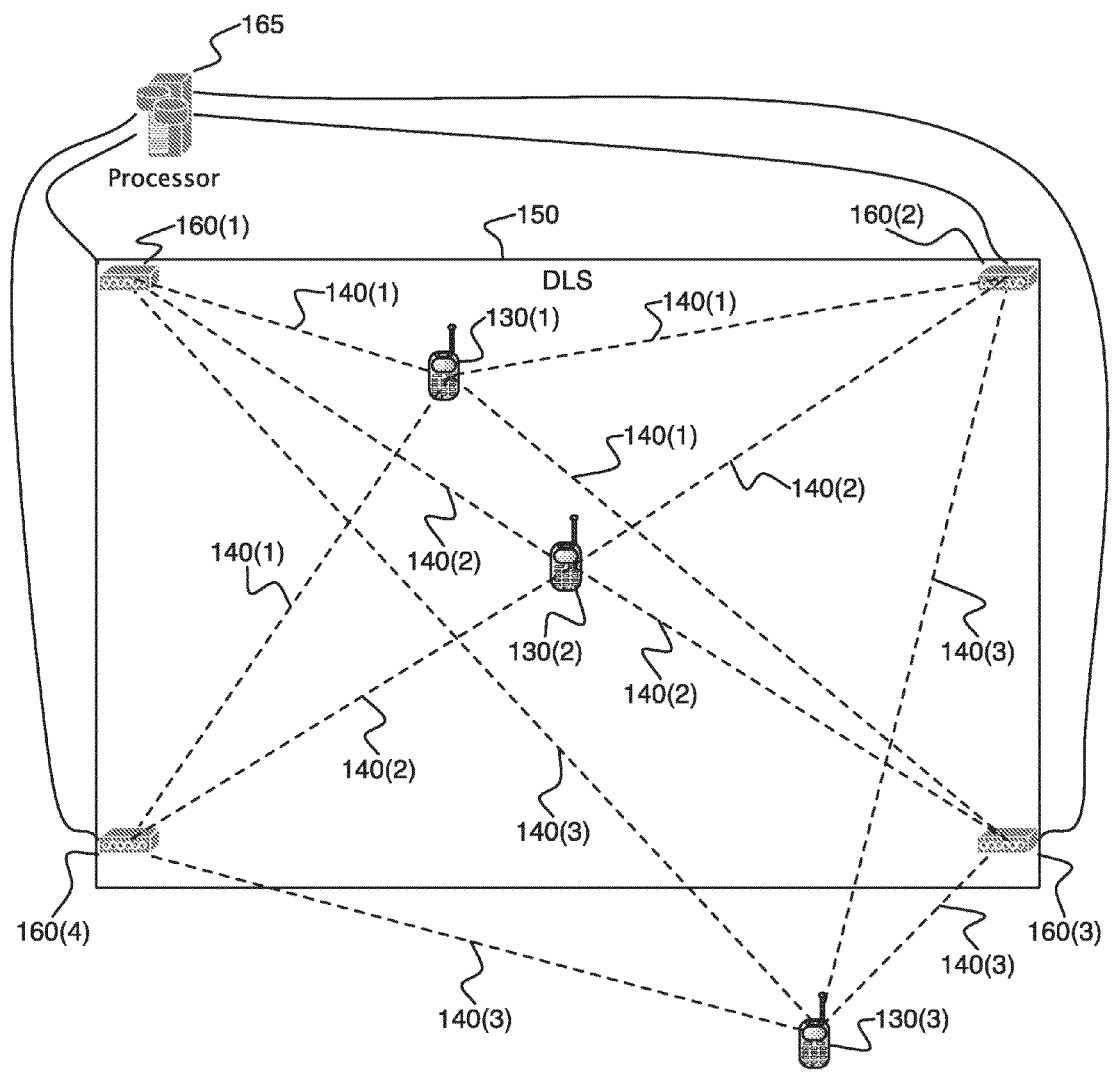
FIGS. 2a and 2b provide a diagrammatic view of one approach for practicing the present invention in an application that does not involve any direct or indirect control of two-way wireless terminal devices in a DLS environment.
Figure 2B:
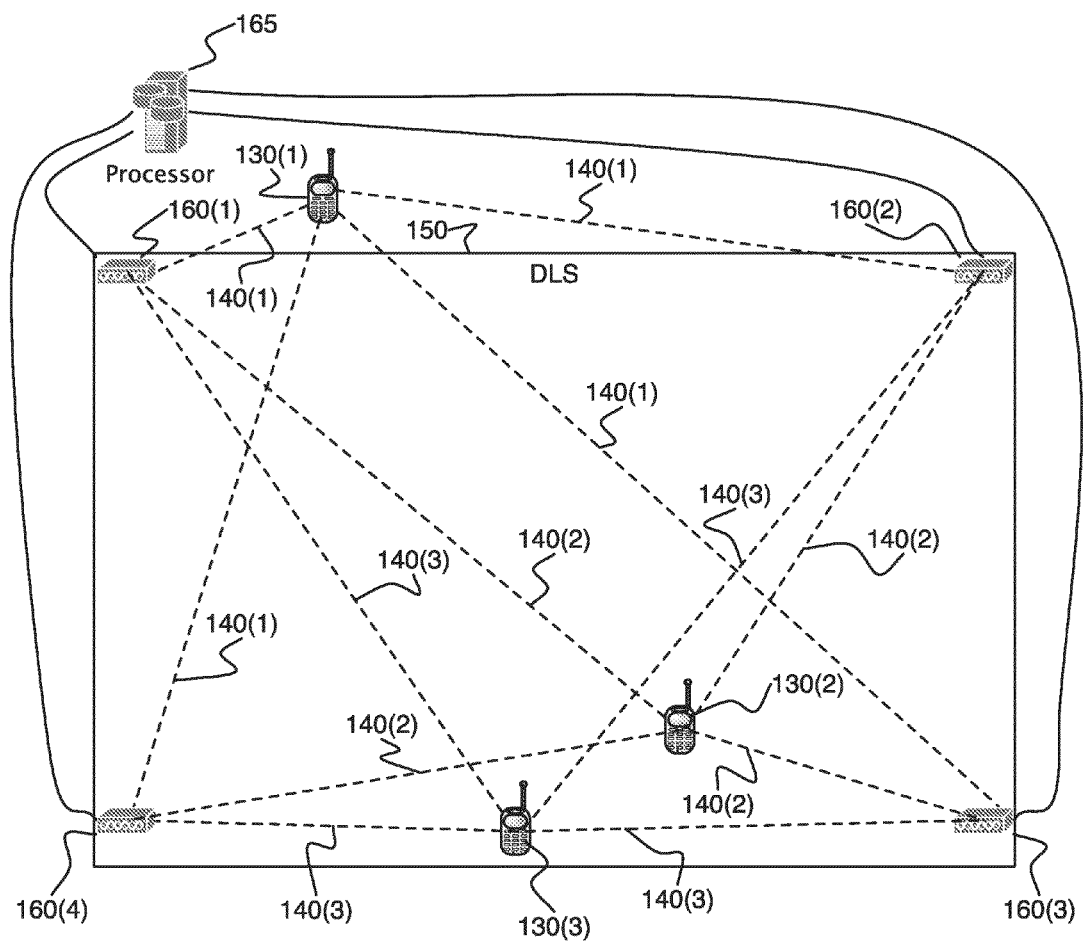

Turning now to FIGS. 2a and 2b, one approach for practicing the present invention for an application that does not involve any control of two-way wireless terminal devices 130 in a DLS environment is shown. The array of DLS receivers, generally 160, and their associated processor 165 detect and locate the specific physical position of all active two-way wireless terminals 130 within the DLS 150. Active two-way wireless terminals 130 outside DLS 150 are exempt from processing. DLS receivers 160 and associated processor 165 taken together include automatic radiolocation capability. Intra-DLS radiolocation of discrete two-way wireless terminals 130 is accomplished by relative time of arrival calculations, for all detected discrete TID/ESNs 142 of all terminal technologies that have an RF "presence" within the DLS 150. Here, a plurality, and preferably four or more, synchronized DLS Receivers 160(1)-160(4) are placed and connected together to processor 165, with relative physical distance calibration values obtained from actual placement of individual DLS receivers 160(1)-160(4). The connection to processor 165 can, of course, be accomplished through any of a variety of wired or wireless means. The resulting set of possible relative RF propagation time delays among all DLS receivers 160(1)-160(4) for all points within the three-dimensional region in a particular DLS allows immediate calculation by processor 165 of the specific physical location of two-way wireless terminals 130(1) and 130(2) within the DLS, and the immediate exclusion of two-way wireless terminal 130(3) that happen to be outside the boundaries of the DLS.

It can be appreciated, then, that the illustration of FIG. 2a corresponds to a first time interval during which each of receivers 160(1)-160(4), which comprise receiver array 160, intercepts associated return signals 140(1)-140(3) which is, respectfully, associated with wireless terminals 130(1)-130(3). Recall that each return signal might be responsive to a ping request transmitted in the overhead RF channel from an associated base station. The intercepted signals correspond to a first sampling of signals transmitted by an associated set of two-way wireless terminals within the DLS during the first time interval. It can be appreciated, then, that return signal 140(3) which is broadcast from a two-way wireless terminal 130(3) outside DLS 150 will fall outside the allowable set of possible DLS relative time delays, and any further calculation of physical location, counting, and all other application parameters may be aborted. Although a different physical architecture, it is such calculation of relative time of arrival of radio signals that make possible the Global Positioning System ("GPS") location capability. The DLS architecture and the present radiolocation method enable many disparate applications that require individual active two-way wireless terminal 130 physical position tracking within a DLS. In any event, the network architecture can, thus, ascertain that the first set of wireless terminals within the DLS during the first time interval only includes terminals 130(1) and 130(2). Initial location information can, thus, be logged for these two wireless terminals.

FIG. 2b illustrates a second time interval during which it may be seen that wireless terminal 130(3) has now moved into DLS 150, while wireless terminal 130(1) is now outside DLS 150. Accordingly, when the wireless terminals transmit their reply signals, these are intercepted by the synchronized DLS receivers 160(1)-160(4) as a second sampling of signals. This information is then transmitted to processor 165 which is able to ascertain that an associated second set of wireless terminals within the DLS now corresponds to terminals 130(2) and 130(3), but not 130(1). Here again, subsequent location information can now be logged for this second set of wireless terminals that are present within the DLS during the second time interval. The DLS architecture can thereafter compare the initial location information to the subsequent location information to ascertain tracking movement of the wireless terminals within the DLS, namely, that wireless terminal 130(1) has moved out of the DLS while wireless terminal 130(3) has moved into the DLS. It should be appreciated that FIGS. 2a and 2b illustrate a very simplistic version of events which can be monitored to ascertain movement of wireless terminals into and out of a given DLS. Of course, this foundation can be used to gather information pertaining to any of a variety of movement scenarios for a variety of DLS regions.

Figure 3A:
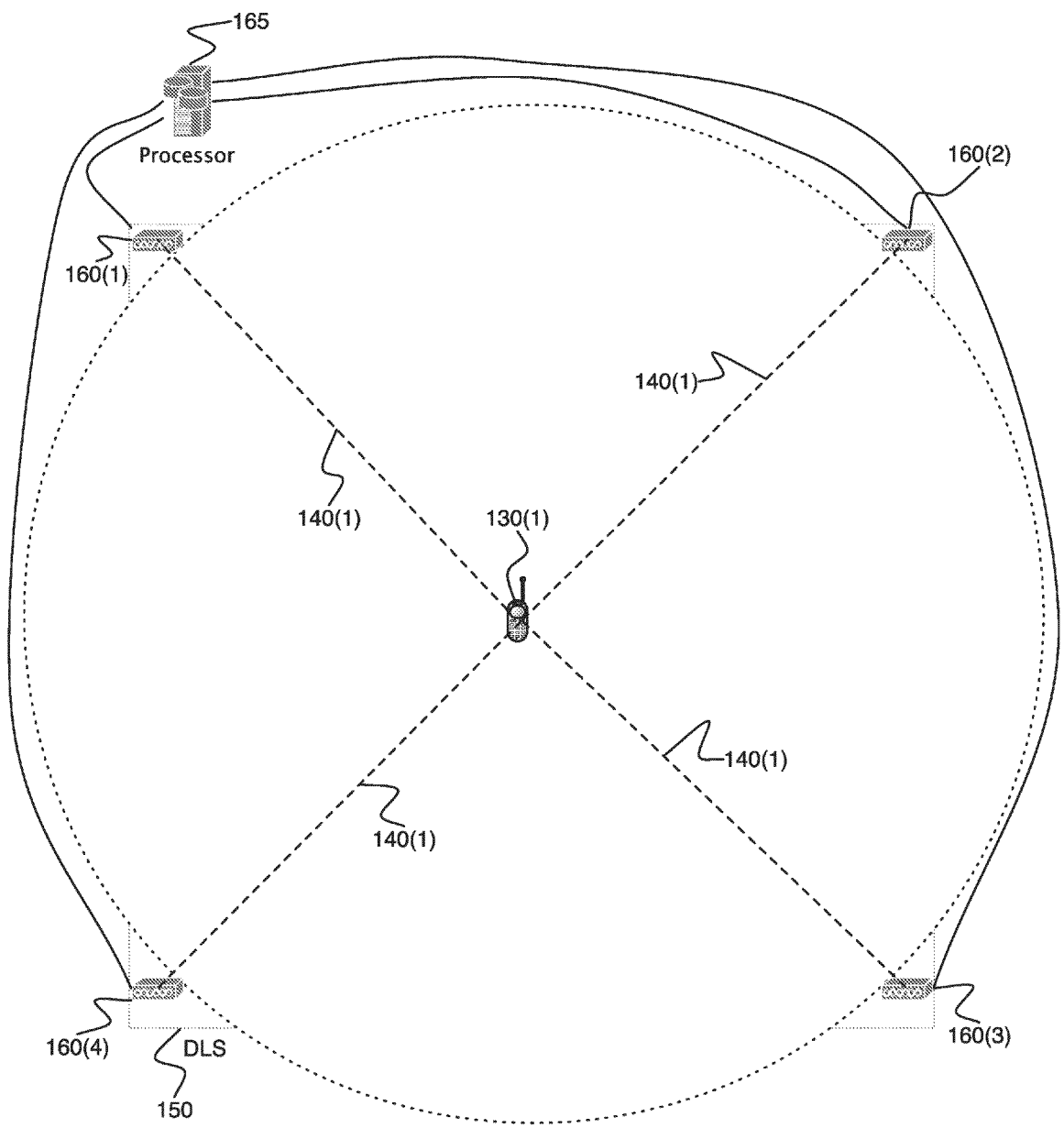
FIGS. 3a and 3b demonstrate in two dimensions a diagrammatic view of the method for practicing the present invention.
Figure 7:
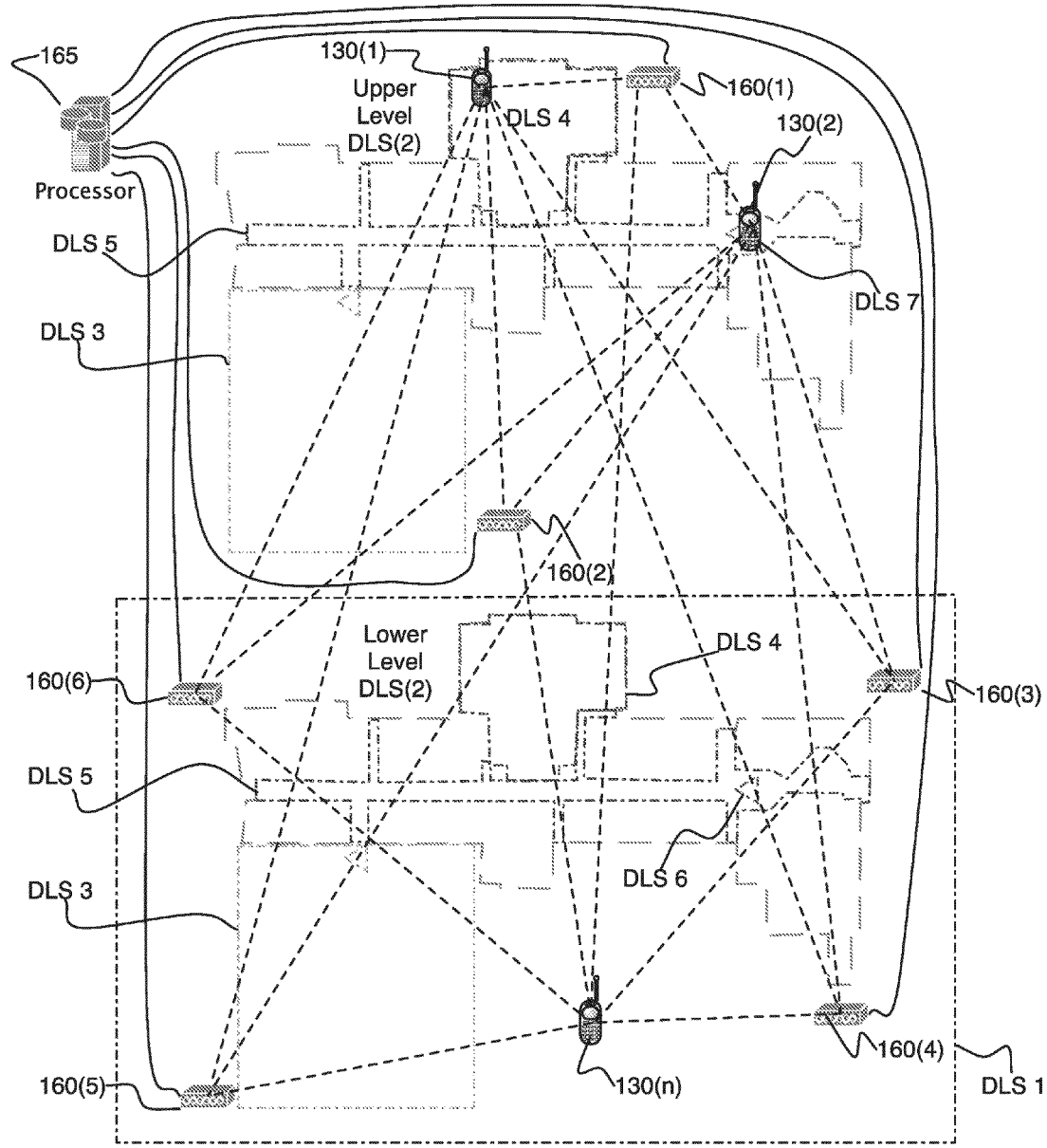
FIG. 7 illustrates a multi-DLS example environment using a representative DLS Receivers/Processor platform to create discrete sub-DLSs within a master DLS; and, FIGS. 8a and 8b illustrate different embodiments of an information gathering method according to the teachings herein.

Turning now to FIG. 3a, the radiolocation method is specifically illustrated. FIG. 3a is drawn in only two of the three dimensions to teach the radiolocation method with better clarity. The radiolocation method illustrated in FIG. 3a comprises a multiplicity of synchronized DLS receivers 160(1)-160(4) connected to a common processor 165, using relative time of arrival of modulated return-path signals 140(1) containing TID/ESN information to calculate the physical position of detected two-way wireless terminals in a DLS 150. Here, two-way wireless terminal 130(1) is located exactly equidistant from all four synchronized DLS receivers 160(1)-160(4). All synchronized DLS Receivers 160(1)-160(4) will, thus, receive the modulated return signal 140(1) at exactly the same instant in time, and processor 165 will calculate and report the position of said two-way wireless terminal 130(1) at only one possible position at the exact center in the area of a regular, two-dimension, four-sided polygon of the simplified illustration. If the four synchronized DLS receivers 160(1)-160(4) are respectively arranged instead to become the points of an equilateral tetrahedron (a four-sided pyramid) and they all receive modulated return signal 140(1) at the same instant in time, two-way wireless terminal 130(1) is now reported by processor 165 to be at the exact center of the three-dimensional space within the pyramid. Accordingly, there is one and only one set of coordinate values for each physical point within the three-dimensional space of a given DLS 150. Synchronized DLS receivers 160(1)-160(4) and non-zero relative time of arrival calculations by processor 165 allow accurate dynamic radiolocation of each two-way wireless terminal in near real-time for all other possible points within the DLS 150, as well. This deterministic radiolocation method allows for the creation of a hierarchy of DLSs, permitting, for example, multiple unique DLSs for each store within a multi-tenant shopping mall, including common areas such as parking lots, walkways and multiple levels or stories, as shown in FIG. 7.

Figure 3B:
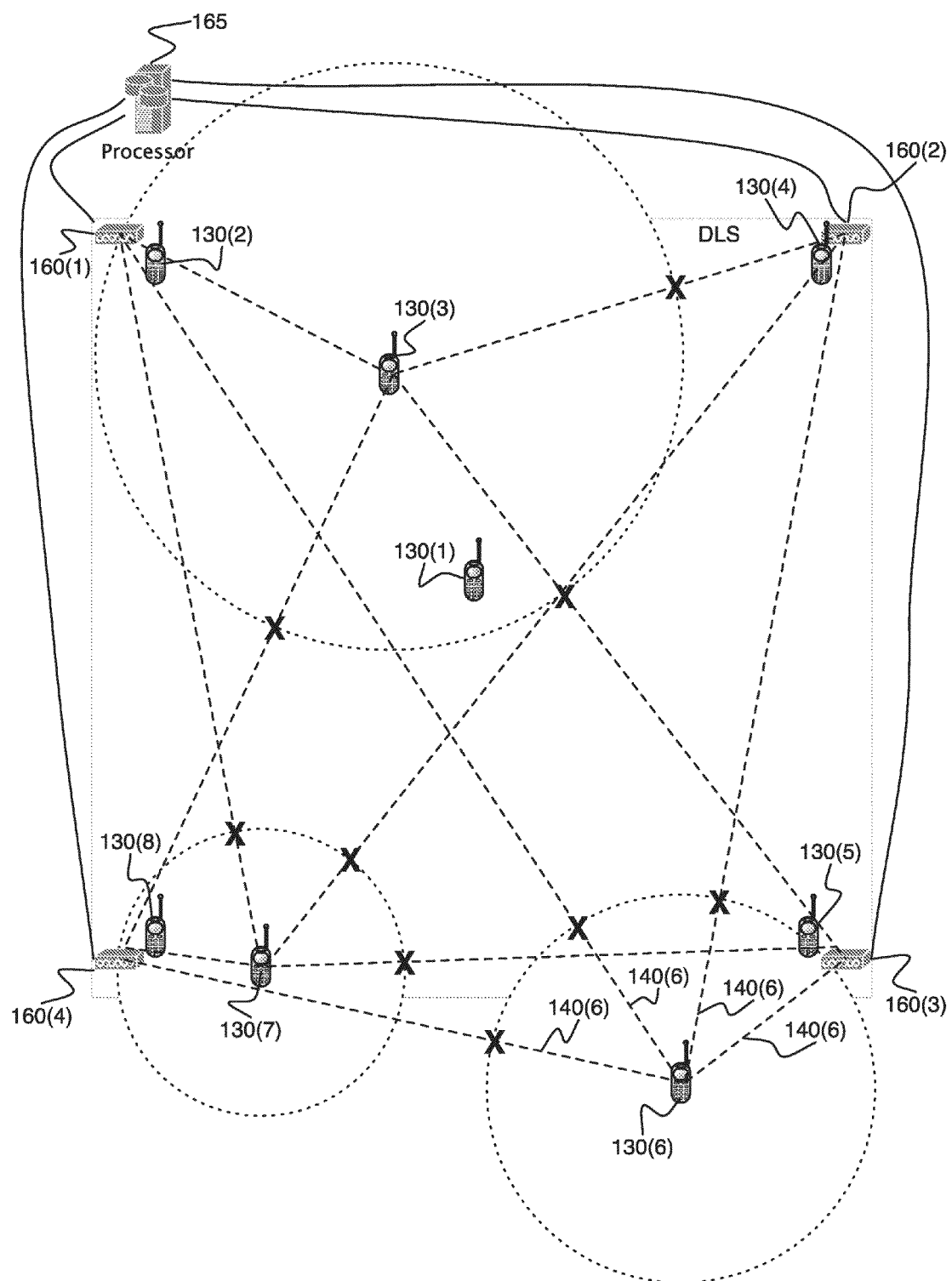

Turning now to FIG. 3b, the radiolocation method is illustrated for a multiplicity of other two-way wireless terminals 130(1)-130(8). Two-way wireless terminals 130(3), 130(6), and 130(7) are shown with dashed lines drawn to each of the four synchronized DLS receivers 160(1)-160(4). Two-way wireless terminals 130(1), 130(2), 130(3), 130(4), 130(5), 130(7), and 130(8) are physically within DLS 150, and two-way wireless terminal 130(6) is physically located outside DLS 150. The modulated return signal 140(6) from two-way wireless terminal 130(6) arrives first at DLS receiver 160(3), then slightly later in time at DLS receiver 160(4), then even later at DLS receiver 160(2), and lastly in time at DLS receiver 160(1). Processor 165 calculates the relative time of arrival ("RTOA") information from the multiplicity of synchronized DLS receivers for modulated return signal 140(6) and determines the location of two-way wireless terminal 130(6) to be outside the range of predetermined three-dimension coordinate values of DLS 150. Calculation of RTOA information from all other two-way wireless terminals 130 within DLS 150 by processor 165 allows the determination of exact location of each terminal at one and only one location within the DLS at any given instant in time.

Figure 4:
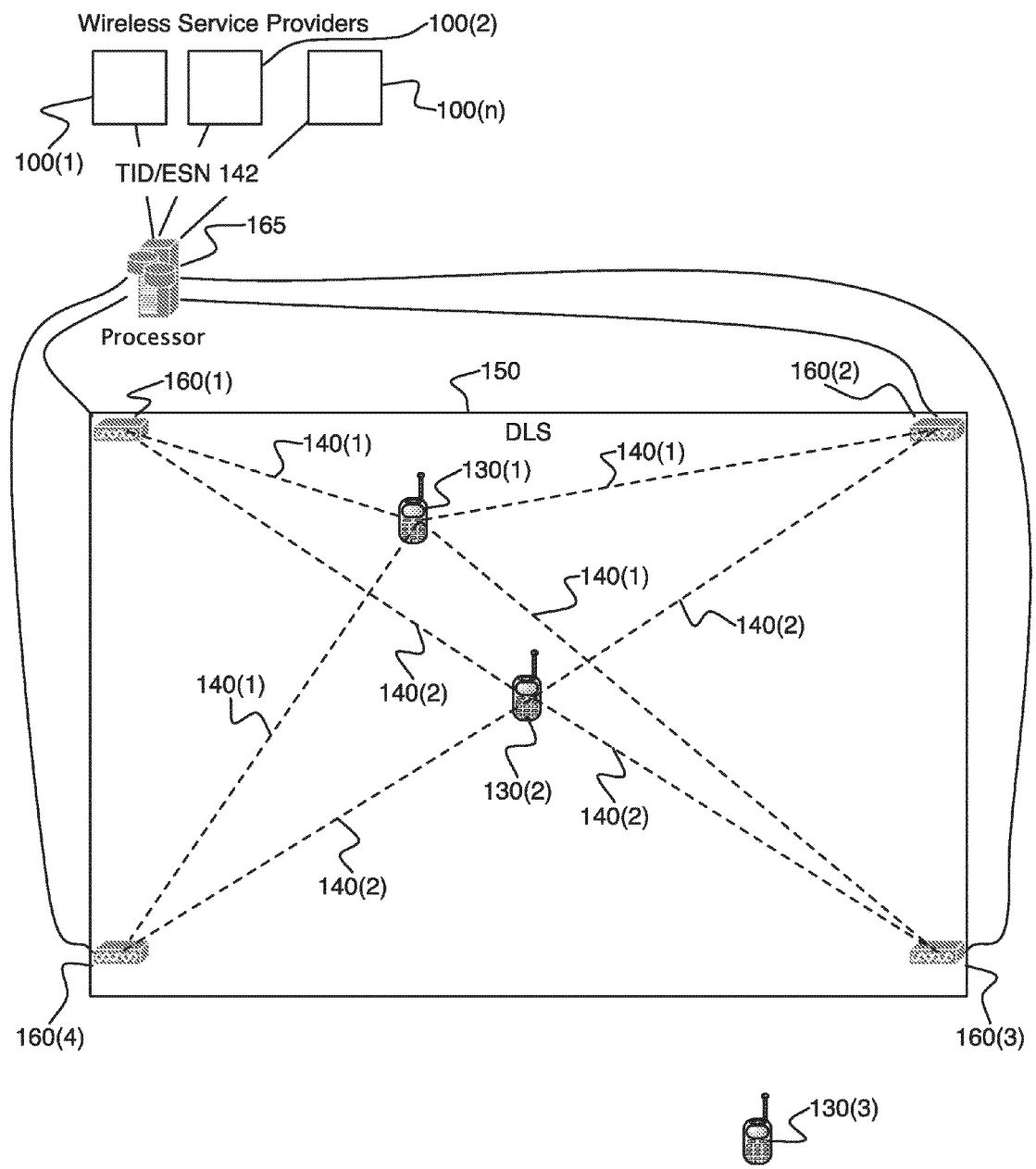
FIG. 4 is a diagrammatic view for illustrating one embodiment of an approach for practicing the present invention in an application that does involve indirect control of features and functions of one or more two-way wireless terminal devices in a DLS environment.

Turning now to FIG. 4, one embodiment of an approach is now depicted for practicing the present invention in an application that involves indirect control of features and functions of one or more two-way wireless terminals in a DLS environment. As in the previous embodiment, DLS Receivers 160(1)-160(4) and associated processor 165 detect and specifically locate all two-way wireless terminals 130 of all wireless customers within the DLS 150. Processor 165 is programmed to also upload to respective wireless service providers 100(1)-100(n) the TID/ESNs of all two-way wireless terminals 130(1)-13(n), respectively, detected within DLS 150, with instructions to silence and/or deny service to said terminals (except for outgoing E911 emergency calls) that are detected within DLS "quiet zones," for example, wireless terminals 130(1) and 130(2) here. For purposes of this example, the "quite zone" could correspond to the geometry of the DLS 150, itself. However, the ordinarily skilled artisan would also appreciate that the quite zone could be a particular subset space or spaces, within the DLS 150. The embodiment of FIG. 4 would understandably require a prior arrangement between the DLS entity 150 and all wireless service providers 100(1)-10(n) that have an RF "presence" within the DLS 150 desiring to establish such area-specific "quiet zones."

Figure 5:
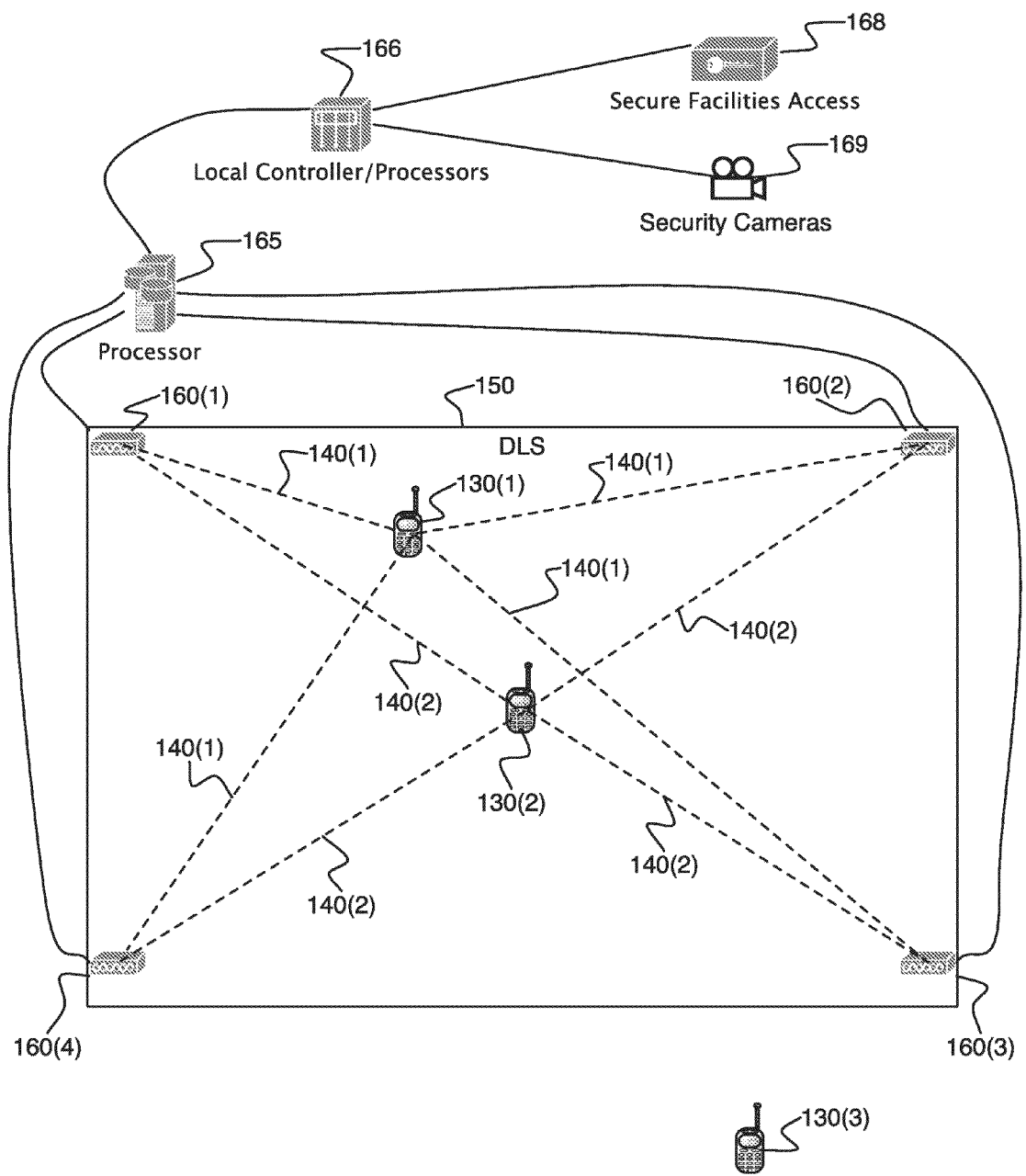
FIG. 5 is a diagrammatic view for illustrating one embodiment of an approach for practicing the present invention in an application that involves local-only limited control of DLS systems or subsystems according to specific two-way wireless terminals detected within the DLS.

Turning now to FIG. 5, one approach for practicing the present invention in an application that involves local-only limited control of DLS systems 150 or subsystems 168 and 169 according to specific two-way wireless terminals 130 detected within the DLS 150 is shown. Here, discrete two-way wireless terminals 130(1) and 130(2) that are detected and located by the DLS receiver array 160 and processor 165 provide input to local controllers/processors 166 of systems and subsystems only within DLS boundaries. Such local controllers/processors 166 may be used to control systems and subsystems such as secure facility access 168, security cameras 169, and the like. Rather than relying only on facial recognition in the situation of manually operated security cameras, this application enabled by the present invention would automatically and accurately "tag" a suspect with a self-training camera linked to a detected TID/ESN.

Figure 6:
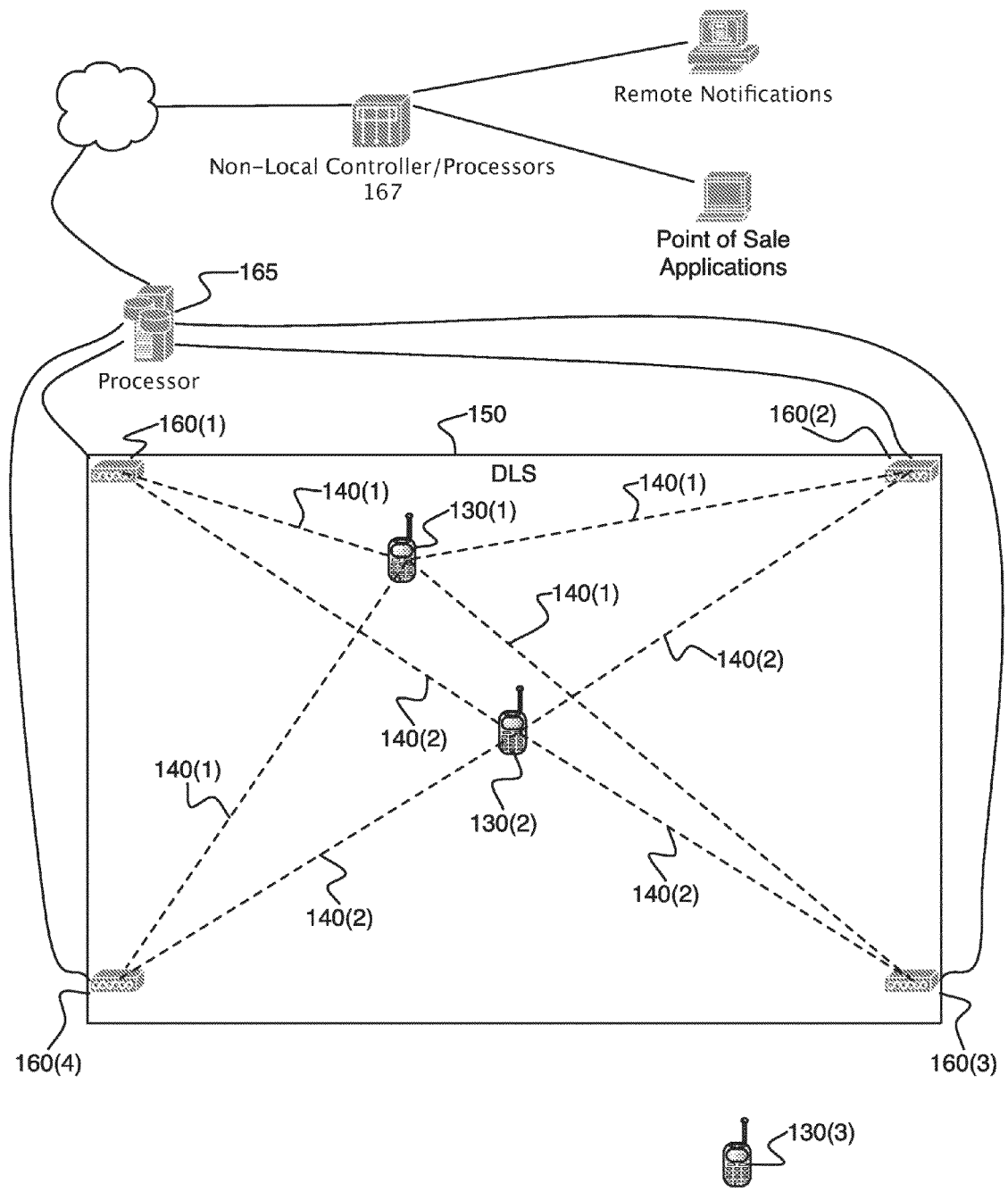
FIG. 6 illustrates one approach for practicing the present invention in an application that involves remote control of systems or subsystems outside DLS boundaries.

Turning now to FIG. 6, one embodiment of an approach for practicing the present invention in an application that involves remote control of systems or subsystems outside DLS boundaries is shown. Similar to the previous approach enabling the example local DLS application, this approach provides detected and processed information from within a DLS to other non-local controller/processors 167. Applications of such an embodiment include automatic remote notification of the appearance of a TID/ESN within another non-contiguous DLS location, such as among multiple satellite locations of a geographically diverse entity. Yet another extra-DLS application could require electronic association of a credit card number with detected customer TID/ESN before a point-of-sale transaction is remotely authorized.

Turning now to FIG. 7, one example of a multi-DLS environment using a common DLS receivers/processor platform to create discrete sub-DLSs within a master DLS is shown. Since all possible coordinate values for the three-dimensional space within a master DLS can be established, discrete sub-DLSs can also be established as defined exclusive subsets of master DLS coordinate values. A minimum of four synchronized DLS receivers 160 in a master DLS are required to establish any particular point in the included space of a defined sub-DLS, and the coordinate values will not be repeated in any of the remaining defined sub-DLSs within the master DLS. The example illustrated in FIG. 7 employs six synchronized DLS Receivers which comprise array 160(1)-160(6), but a greater number may be required for complete coverage of complex DLS environments. It will be obvious to those skilled in the art that the present invention may also be used in a variety of other similar DLS applications, including, for example, time-stamping specific TID/ESNs in specific areas of a DLS, for the purpose of identifying an unauthorized person.

Figure 8A:
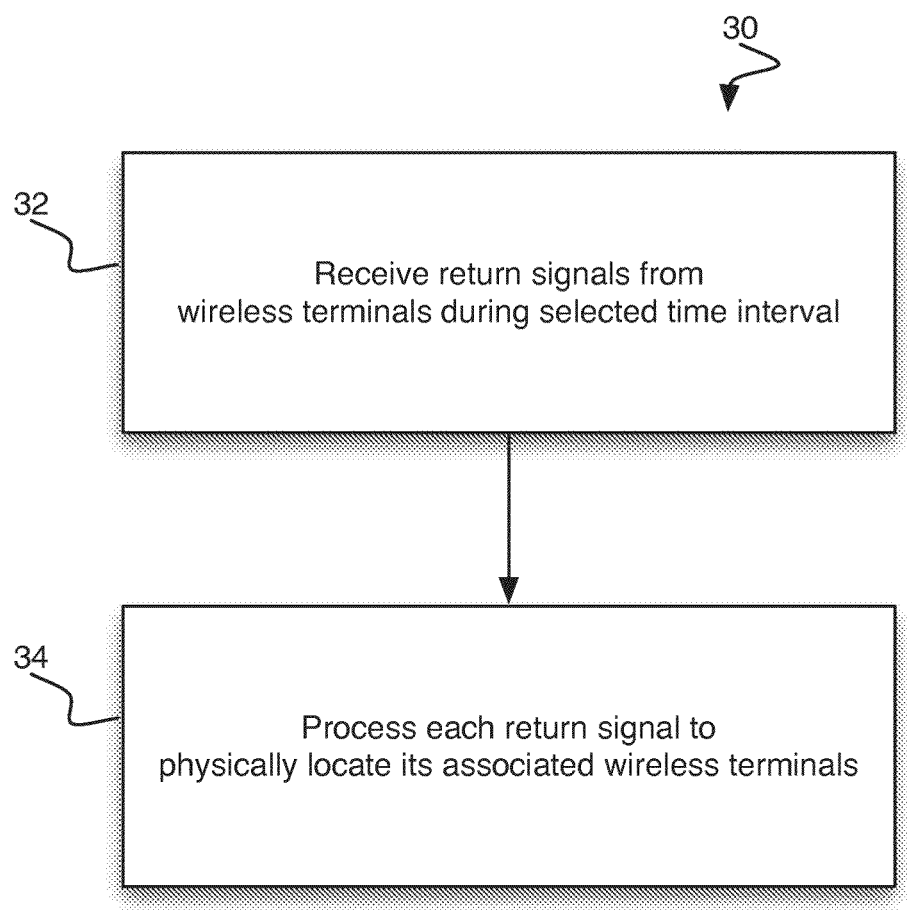

With the above description in mind, it may be appreciated that various methods are contemplated for gathering information. According to a broad version of a methodology 30 as shown in FIG. 8a, return-path signals that are transmitted from two-way wireless terminals within a DLS are received at 32 over a selected time interval and thereafter processed at 34 to ascertain physical location information about each signal's associated two-way wireless terminal within the DLS.

Figure 8B:
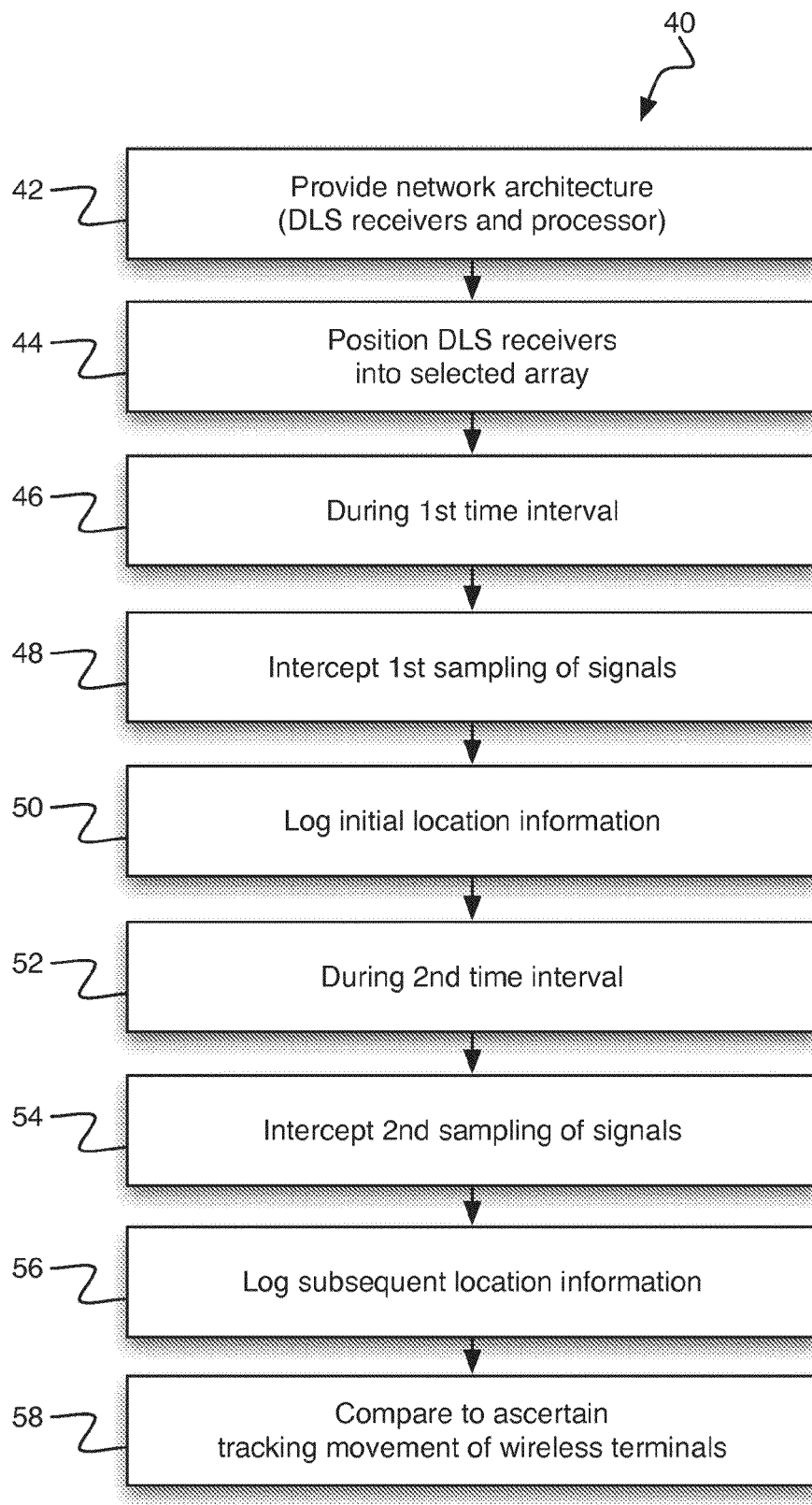

A more detailed, non-intrusive information gathering method 40 is diagrammed in FIG. 8b. Here, a network architecture is provided at 42. The network architecture includes a plurality of synchronized receivers and at least one processor, as discussed above. At 44, the receivers are positioned in a selected array to define the DLS. During a first time interval at 46, a first sampling of signals is intercepted by the receivers at 48. This first sampling of signals, as discussed above, is that which is transmitted by an associated first set of two-way wireless terminals within the DLS, with each received signal being associated with a particular one of the wireless terminals during the first time interval. At 50, initial location information is logged for the first set of wireless terminals. Thereafter, during a second time interval 52, a second sampling of signals is intercepted at 54, and subsequent location information is logged at 56 corresponding to the set of wireless terminals within the DLS during the second time interval. Then, at 58, the initial location information is compared to the subsequent location information to ascertain tracking movement of wireless terminals within the DLS.

Figure 9:
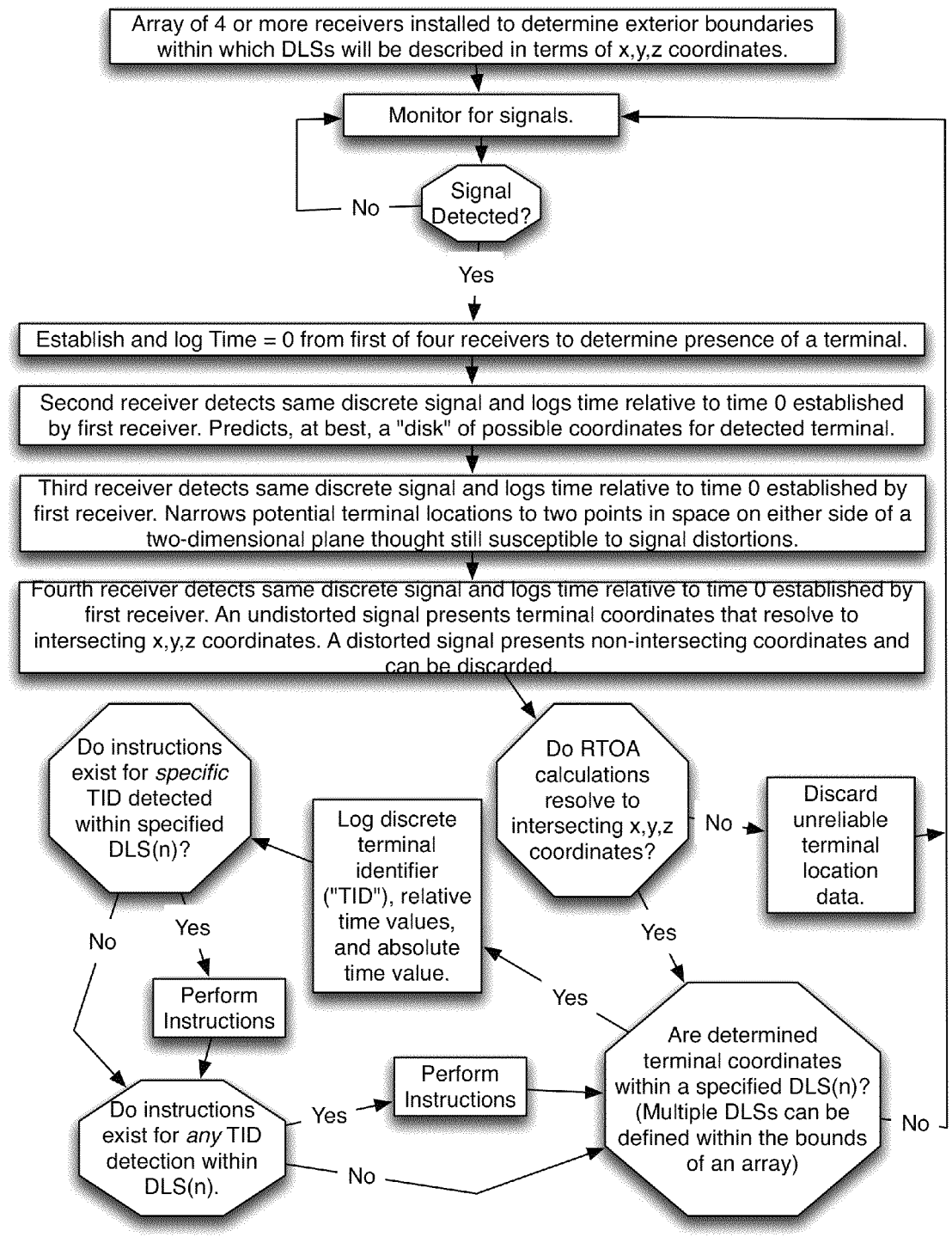
FIG. 9 illustrates a workflow diagram as contemplated by non-limiting aspect of the present invention.

Turning now to FIG. 9, the workflow diagram describes the basic process from monitoring for signals, detecting signals, logging signals, locating signals, and processing signals, and performing instruction sets according to time, location, and identification of terminals.

Figure 10:
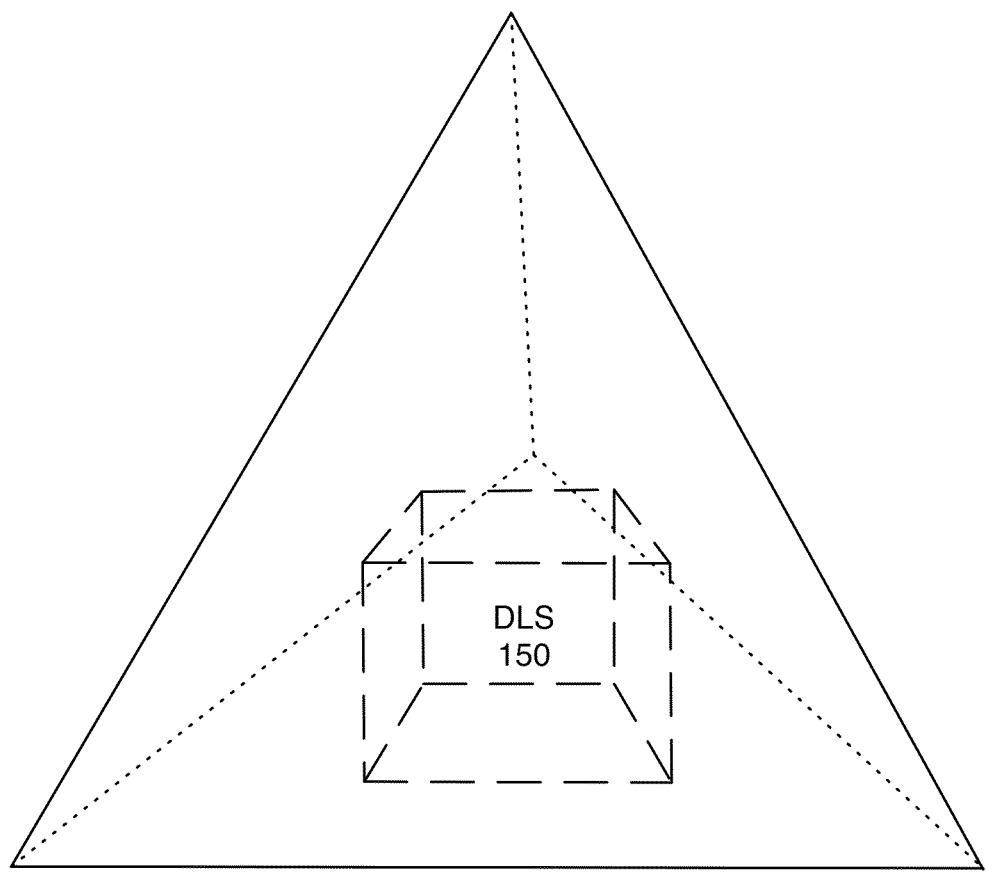
FIG. 10 illustrates a DLS as contemplated by one non-limiting aspect of the present invention.

Turning now to FIG. 10, the drawing illustrates how a rectangular solid space is described as a DLS within a single tetrahedron determined by the position of 4 receivers in an array. By extending the distance of the receivers such that a cubic or rectangular solid space (e.g. room or building) fits entirely within the volume of the tetrahedron. This allows the volume of the cube to be observed with the minimum required 4 receivers.

For applications where the receivers must fit within the cubic or rectangular solid space (e.g. room or building) one wishes to observe, receivers can be installed in each of the 8 vertices of the space, which will define the points of multiple tetrahedra—each becoming its own DLS. Either a five or six-tetrahedra configuration will accomplish 100% coverage with a completely interior receiver configuration. The processor could then compose the data from multiple tetrahedra into a combined and unified DLS, simplifying observance and/or post-processing.

Figure 11:
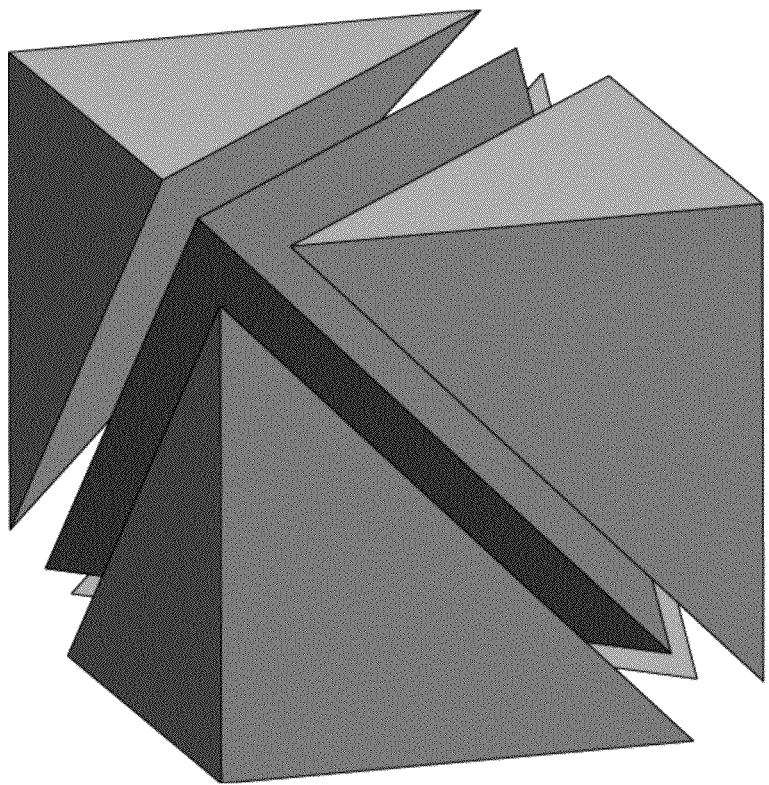
FIG. 11 illustrates a five-tetrahedra configuration as contemplated by one non-limiting aspect of the present invention.

Referring to FIG. 11, a five-tetrahedra configuration might work well for applications where the receivers must fit within the cubic or rectangular solid space (e.g. room or building) one wishes to observe, receivers can be installed in each of the 8 vertices of the space, which will define the points of multiple tetrahedra—each becoming its own DLS. Either a five or six-tetrahedra configuration will accomplish 100% coverage with a completely interior receiver configuration. The processor could then compose the data from multiple tetrahedra into a combined and unified DLS, simplifying observance and/or post-processing. The five tetrahedra arrangement is accomplished by slicing off every other vertex. The tetrahedron in the middle is regular.

Figure 12:
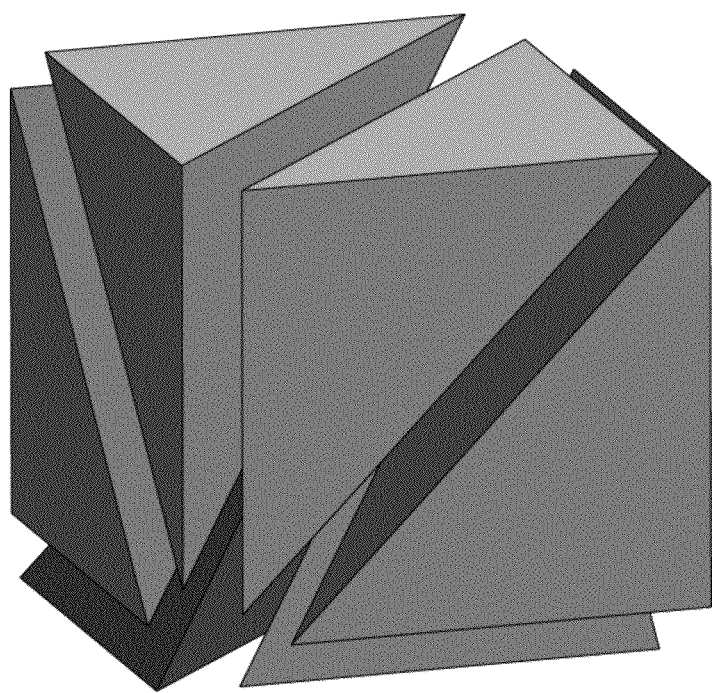
FIG. 12 illustrates a six-tetrahedra arrangement.

Turning now to FIG. 12, a six-tetrahedra arrangement offers an alternative arrangement to the five-tetrahedra arrangement. The arrangement is accomplished by Triangulating each face, choosing a vertex, and connecting each triangle to that vertex.

Figure 13:
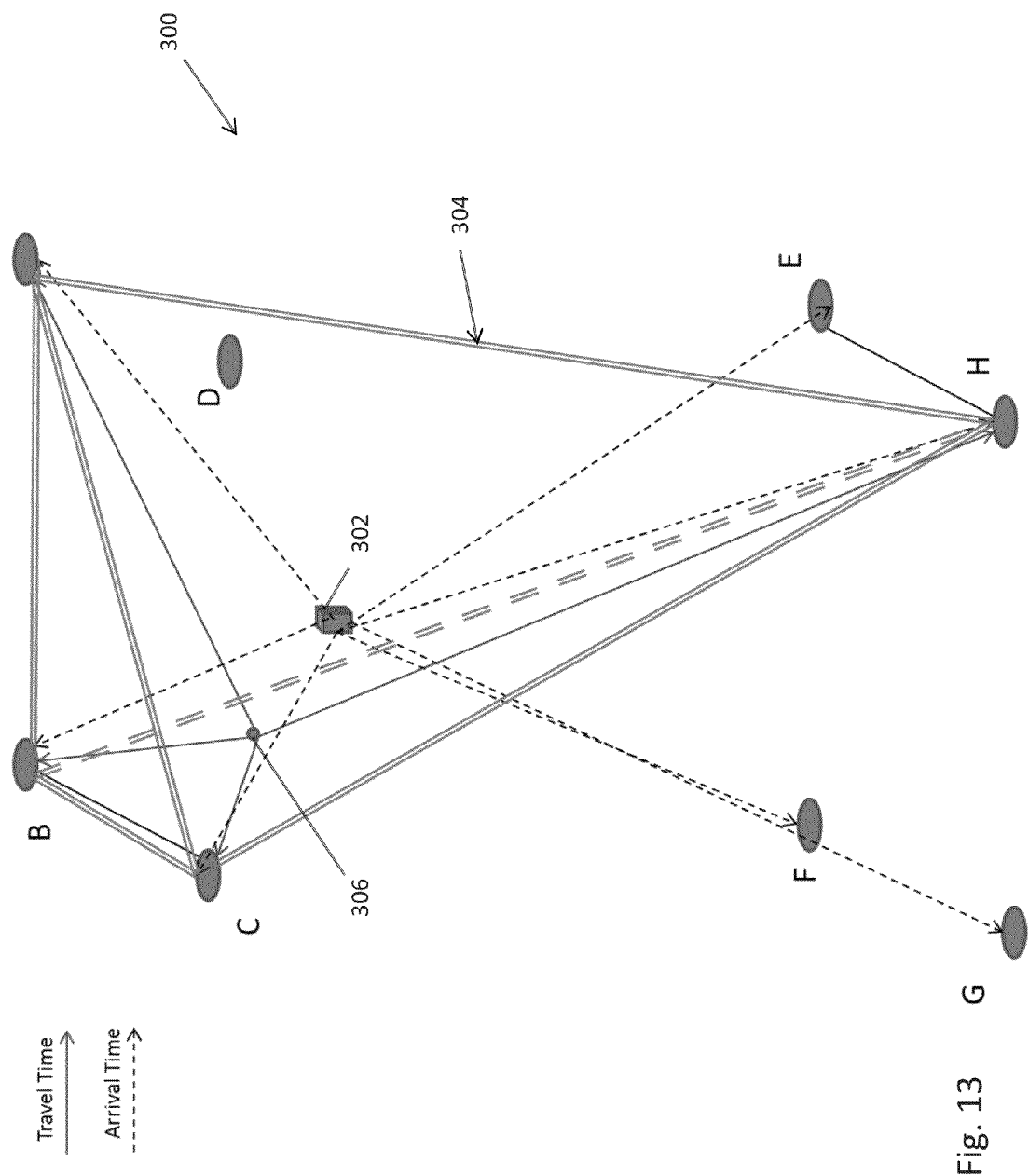
FIG. 13 illustrates an information gathering system as contemplated by one non-limiting aspect of the present invention.

FIG. 13 illustrates information gathering system 300 as contemplated by one non-limiting aspect of the present invention. The system 300 is shown with respect to a plurality receivers A, B, C, D, E, F, G, H, which may be similar to the above-described receivers 160, configured to capture administrative signals transmitted from a wireless terminal 302, which may be similar to the wireless terminal 160 described above. A base station (not shown), such as the base station 110 described above, and a processor (not shown), such as the processor 165 described above, may be in communication with the wireless terminal 302 and/or the receivers A, B, C, D, E, F, G, H. The receivers A, B, C, D, E, F, G, H may be configured capture wireless signals emitted from the terminal 302, such as but not necessarily limited to the above-described administrative signal emitted in response to a ping from the base station. The processor or other sufficient devices, such as a computer program product having a computer-readable medium with non-transitory instructions stored, may include instructions sufficient for determining positioning of the wireless terminal 302 and/or otherwise facilitate information gathering based on the captured wireless signals.

The positional location processing may include determining coordinate and/or physical positioning information for each of the receivers A, B, C, D, E, F, G, H. The position information may be related to one more DLS 304 defined relative to the receivers A, B, C, D, E, F, G, H. A single DLS 304, shaped as a tetrahedron, is shown for simplification, however, a plurality of DLSs may be defined between each of the receivers A, B, C, D, E, F, G, H, optionally with other shapes besides the straight tetrahedron. Each DLS 304 may be defined relative to four or more receiver groupings such that each DLS 304 defines a volume among four receivers A, B, C, D, E, F, G, H, which is illustrated to correspond with receivers A, B, C and H. The DLS 304 may be mathematically characterized or otherwise represented as comprising a plurality of points (for simplification a single point 306 is illustrated). A positioning of each point may be defined relative to the known positioning of the receivers A, B, C, D, E, F, G, H and according to a theoretical or mathematically derived travel time needed for signals to travel therefrom to each of the four receivers A, B, C, H of the corresponding DLS 304. Multiple travel times may be determined for each point 306 depending on the number of receivers A, B, C, D, E, F, G, H defining the corresponding DLS 304, e.g., point 306 is illustrated relative to four travel times corresponding with each one of the four receivers A, B, C, H.

Timestamps may be generated to represent arrival times at which the administrative signal transmitted from the wireless terminal 302 is measured to be received at the receivers A, B, C, D, E, F, G, H. A first receiving one of the receivers, i.e., receiver B, may be associated with a time value of zero such that arrival times of the signals received at the remaining receivers B, C, D, E, F, G, H have a time value greater than zero and proportional to the time taken for the signal to travel to the corresponding receiver B, C, D, E, F, G, H. The arrival times of the signals received at the receivers A, B, C, D, E, F, G, H may be correlated to the mathematically characterized travel times determined for each of the points within the DLS in order to identify positioning of the wireless terminal 302. The wireless terminal 302 may be determined to be within the DLS having the point 306 with arrival times most closely matching/correlating with the measured arrival times. In this manner, actual signals measured by the A, B, C, D, E, F, G, H receivers may be compared to the mathematically characterized signal travel times for each of the points 306 within the one or more DLSs 304 in order to determine positioning of the wireless terminal 302.

Figure 14:
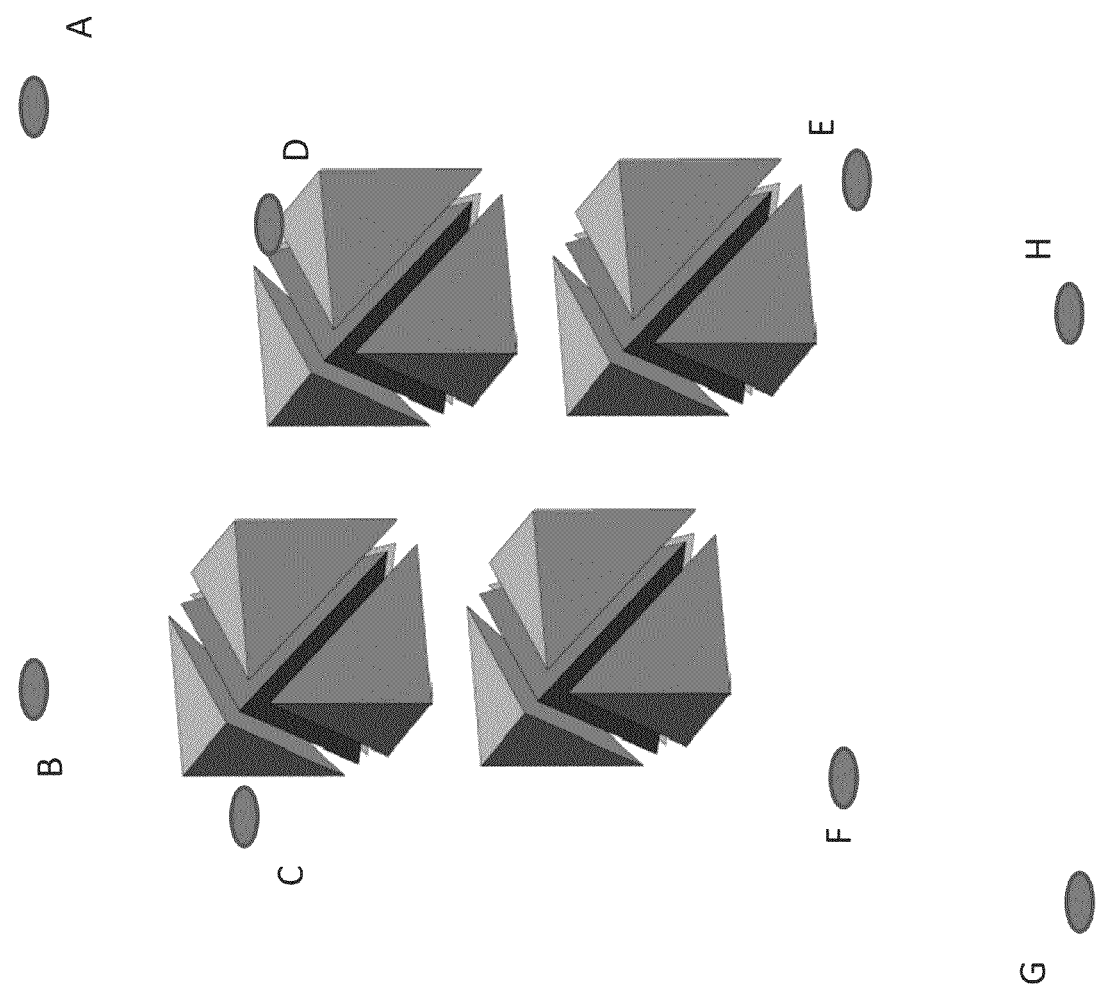
FIG. 14 illustrates a plurality of DLSs in accordance with one non-limiting aspect of the present invention.

FIG. 14 illustrates a plurality of DLSs (each illustrated with a tetrahedron) as defined relative to the plurality of receivers A, B, C, D, E, F, G, H in accordance with one non-limiting aspect of the present invention. The tetrahedron DLSs are shown to define volumes smaller than the volume of the DLS 304 shown in FIG. 13 to illustrate an ability of the present invention to define shapes within a shape, i.e., DLSs having volumes inside or offset from the receivers A, B, C, D, E, F, G, H among which they are defined. This capability may be beneficial in providing more granular positional determinations for the wireless terminal 302. The wireless terminal 302 may be determined to be within a first DLS, such as the larger DLS 304 of FIG. 13, and thereafter, the position may be further defined at a more granular level, optionally based on additional administrative signals, to be within a second DLS encompassed by the larger DLS 304, e.g., one of the tetrahedron DLSs of FIG. 14. Similar to the DLS 304 described above, travel times and arrival times may be correlated to determine points, and thereby a corresponding DLS, within which the wireless terminal is positioned.

Figure 15:
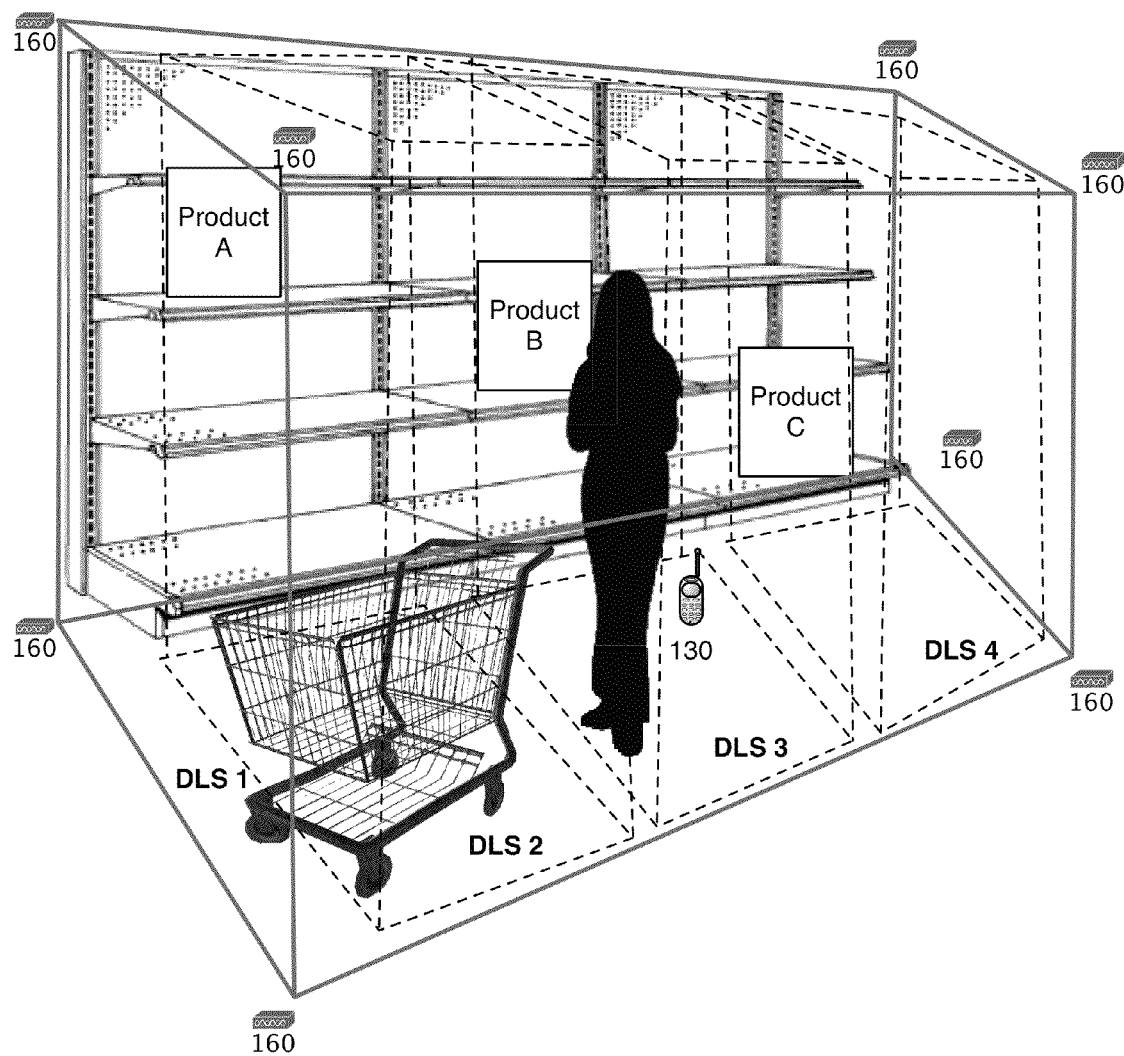
FIG. 15 illustrates an application for tracking shopper behavior and movement.

Turning now to FIG. 15, an application for tracking shopper behavior and movement relative to product placement is described. DLS 1 is characterized as a rectangular solid space along a shopping corridor. DLS 1 is monitored by an array of 8 receivers that construct the shape of DLS 1 from a combination of 6 tetrahedra assembled mathematically by the processor. Within the volume bounded by the positioning of the 8 receivers, and within volume identified as DLS 1, are three additional mathematically delimited spaces (volumes identified by x,y,z coordinates within the tetrahedral arrays) arranged for the purpose of tracking shopper behaviors by calculating the time a shopper spends in front of particular products as an indication of consumer interest. DLS 2 observes shoppers in front of Product A, DLS 3 observes shoppers in front of Product B, and DLS 4 observes shoppers in front of Product C. In this example, the observed terminal (in possession of shopper) is within the corridor identified as DLS 1, standing within DLS 3 indicating shopper's interest in Product B.

Figure 16:
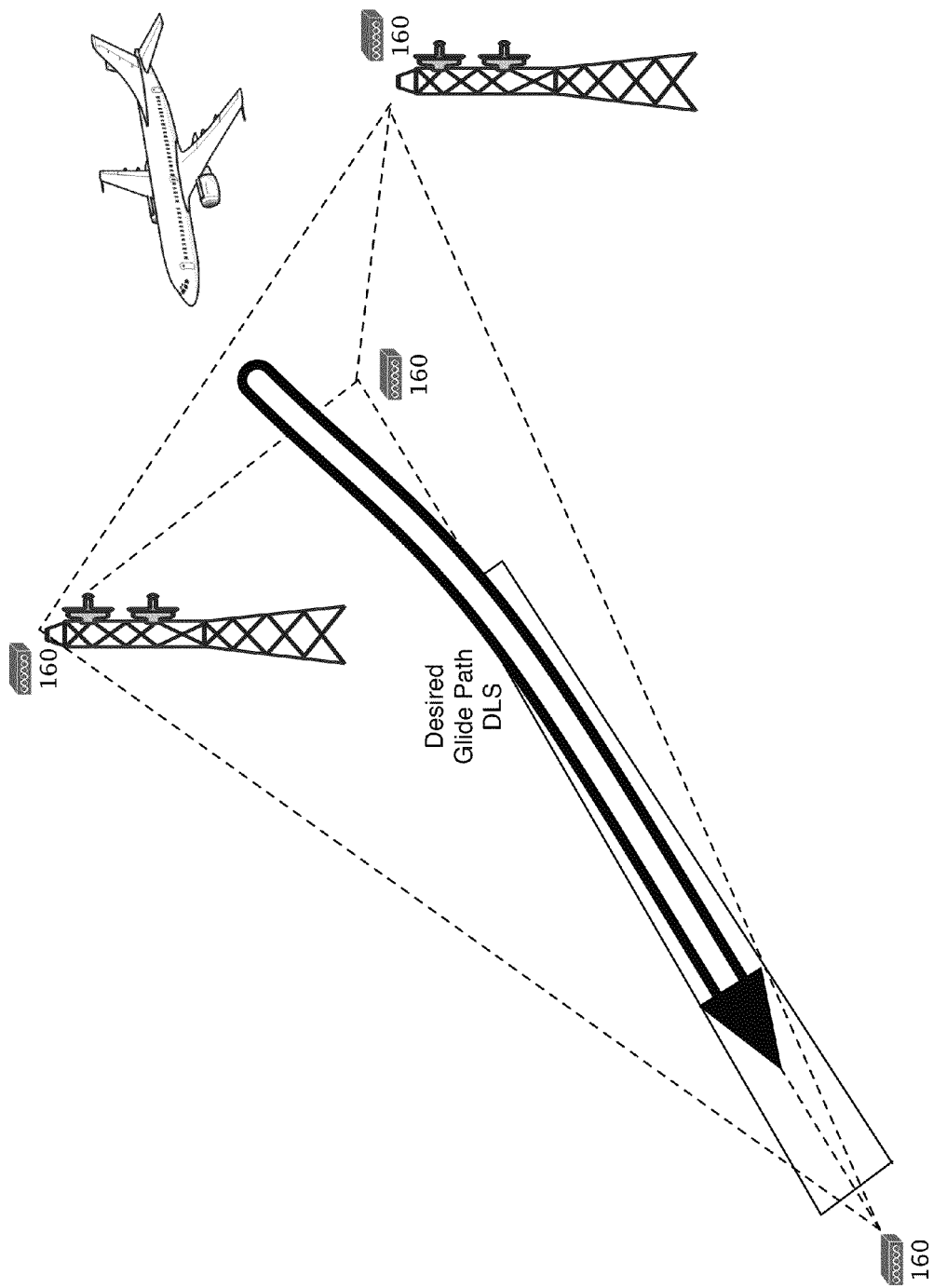
FIG. 16 illustrates an application for guiding a pilot or controlling systems for landing an aircraft.

Turning now to FIG. 16, an application for guiding a pilot or controlling systems for landing an aircraft is described. The DLS is characterized by the desired flight path for landing on the runway. A terminal fixed to the aircraft would be determined to be within or without the DLS an systems to guide the aircraft into the desired coordinates and speed without traditional visual or instrument requirements. Using similar techniques might also be used more broadly as a more general aircraft control system to replace more limited radar and transponder systems.

Figure 17:
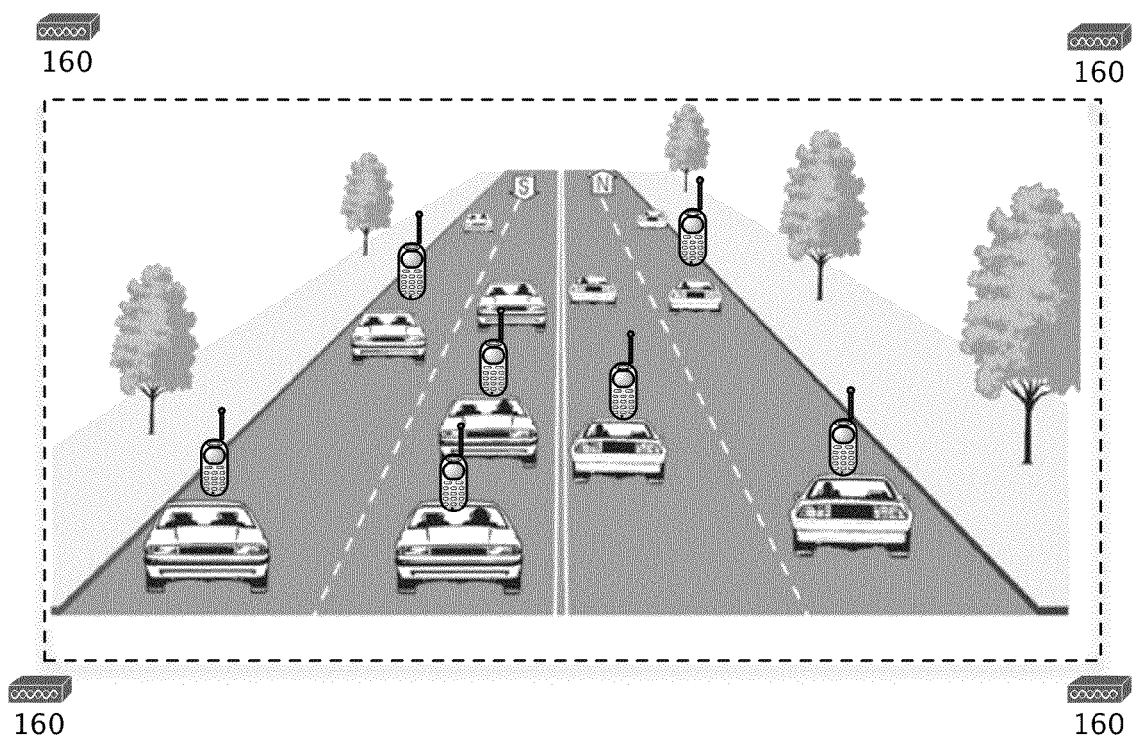
FIG. 17 illustrates an application for observing traffic.

Turning now to FIG. 17, an application for observing traffic is described. Since such a high percentage of motorists possess a terminal such as a cell phone, an extraordinarily high sample rate is available to monitor traffic speeds, volumes and patterns in real-time once a receiver array is installed to observe the terminals traveling along the road—perhaps on utility poles or in service boxes to create the required three dimensional array. It is further contemplated that specialized terminals might control a car's position and speed and separation from other vehicles. Such an application is similar to the one described in FIG. 16 that uses a DLS to guide aircraft position and speed along a defined glide slope for landing.

Figure 18:
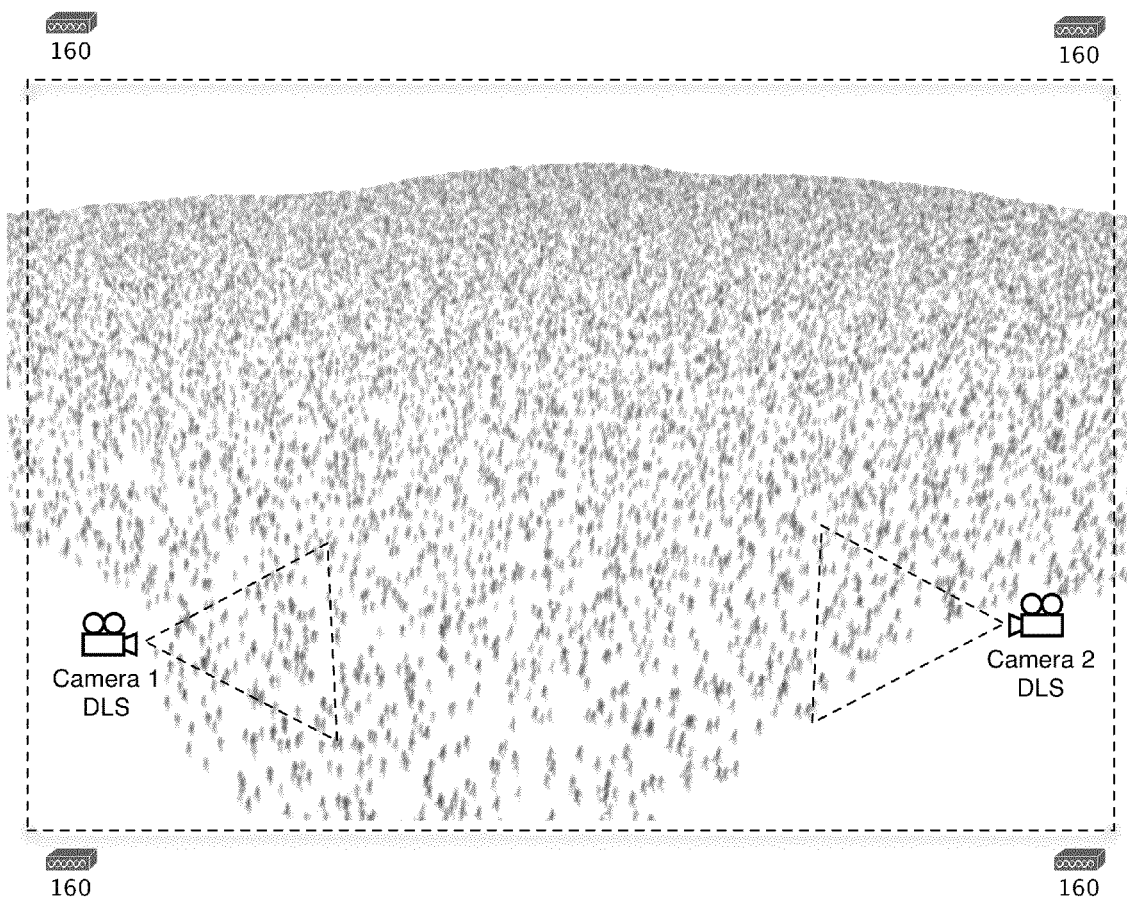
FIG. 18 illustrates an application to count, observer, and track crowds.

Turning now to FIG. 18, an application to count, observer, and track crowds in master DLS is described. Moreover, the system might also be used to detect, locate, and monitor persons of interest within the master DLS. Specific DLSs might also be implemented to activate cameras and other sub-systems when persons of interest enter specific spaces (e.g. plotted to match a camera's view corridor).

Figure 19:
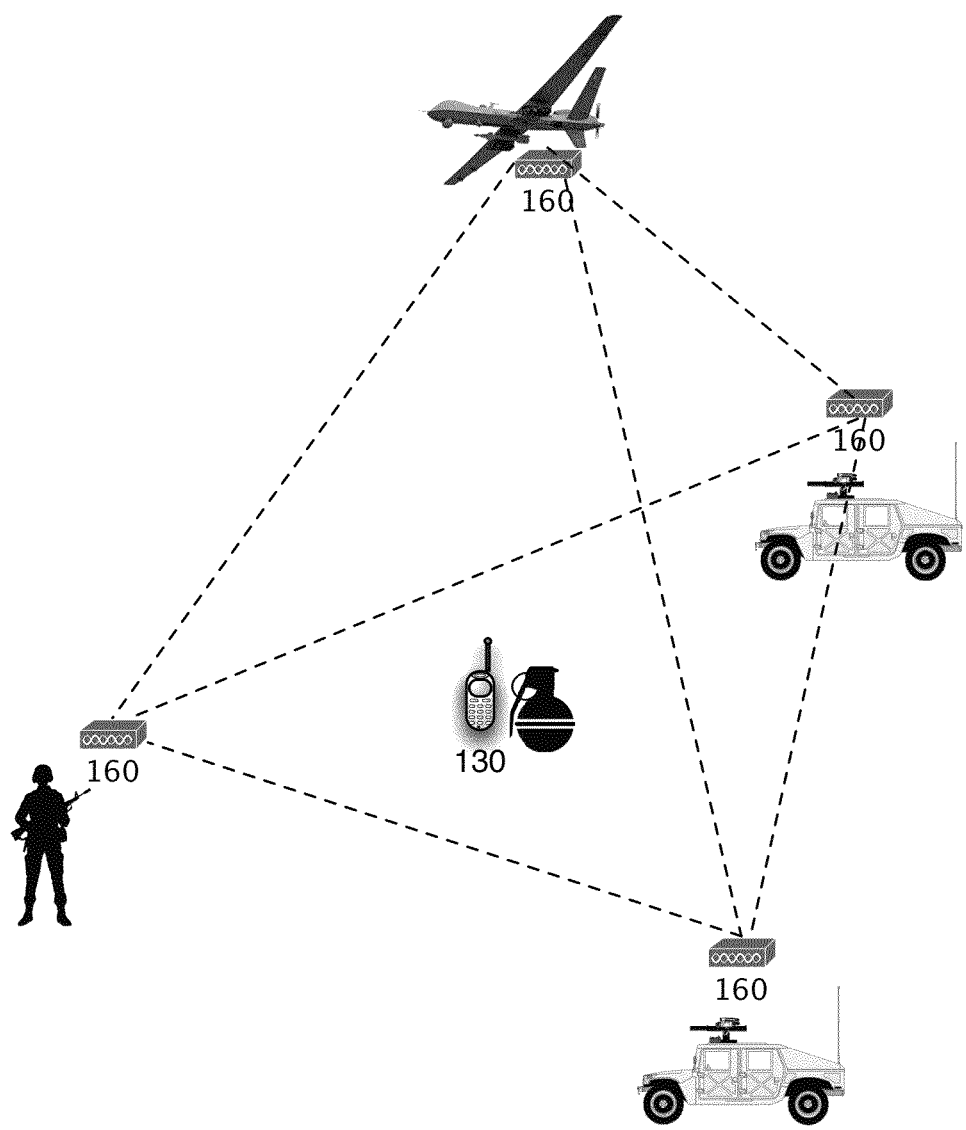
FIG. 19 illustrates an application to detect and disable possible cell phone-triggered Improvised Explosive Devices (IEDs).

Turning now to FIG. 19, an application to detect and disable possible cell phone-triggered Improvised Explosive Devices (IEDs) with a mobile array of receivers is described. As more perminent receiver array installations might be impractical for a military detachment that does not control an area, this example shows a DLS defined by boundaries of mobile array. Any terminal within free-form DLS "sweep" area is documented and potentially disabled or targeted.

Figure 20:
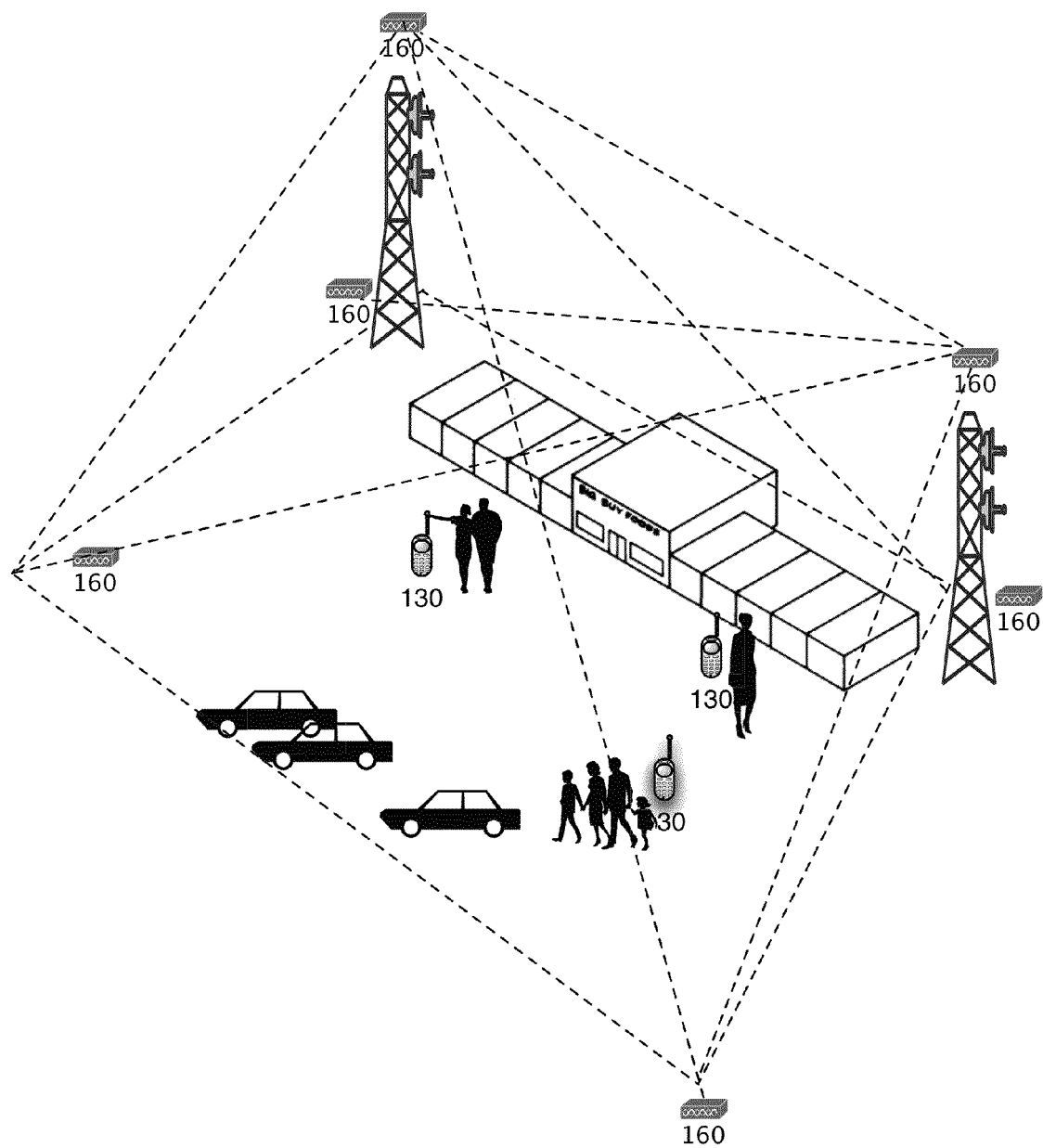
FIG. 20 illustrates an application for observing shopper traffic patterns and behavior as a basis for evaluating commercial real estate value and tenant lease rates.

Turning now to FIG. 20, an application for observing shopper traffic patterns and behavior as a basis for evaluating commercial real estate value and tenant lease rates is shown. In the example, the master DLS includes entire property and possibly the public road in front of the property to determine local marketing exposure and traffic patterns. Sub-DLSs can also be defined to observe individual tenant spaces, common areas, and parking lot. Observing terminals carried by shoppers and potential customers could be used to determine frequency of visits, and other useful consumer behaviors that in addition to using to value commercial space, might also be an important value added offering to existing tenants.

Figure 21:
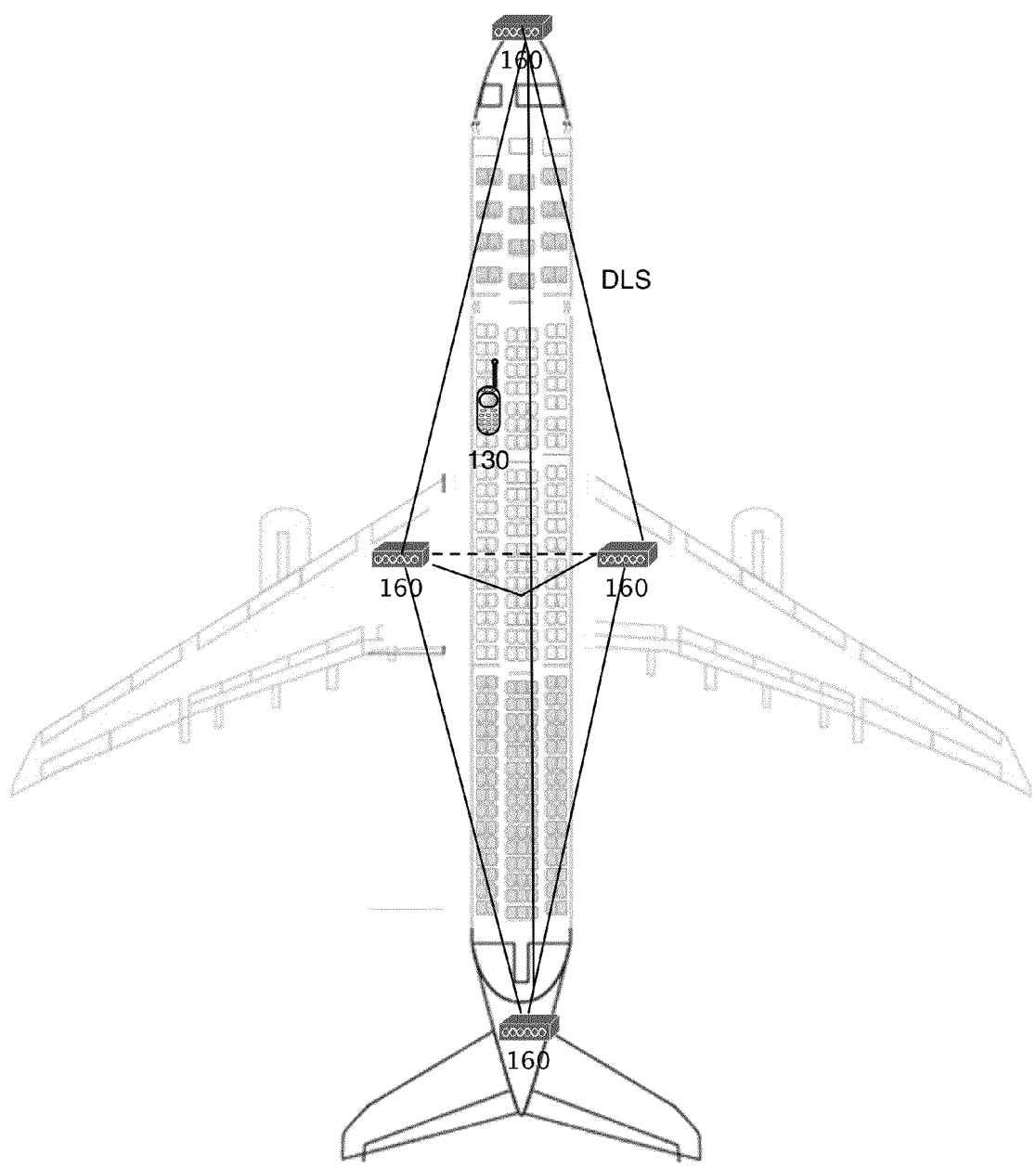
FIG. 21 illustrates an application to detect, locate and potentially disable activated cell phones on an airplane.

Turning now to FIG. 21, an application to detect, locate and potentially disable activated cell phones on an airplane is shown. The DLS in this example is defined as the passenger cabin.

Figure 22:
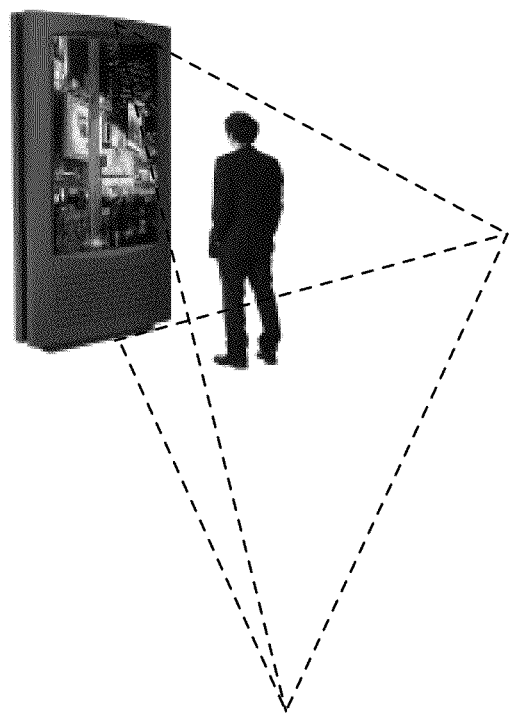
FIG. 22 illustrates an intelligent advertising kiosk application.

Turning now to FIG. 22, an intelligent advertising kiosk application is shown. Having observed the terminal in the man's pocket throughout the mall space defined within the master DLS, an advertising kiosk intelligently presents a highly-targeted message based on where he has been and his observed behaviors. The DLS in this example is defined as the space within which one can view the ad kiosk message.

Figure 23:
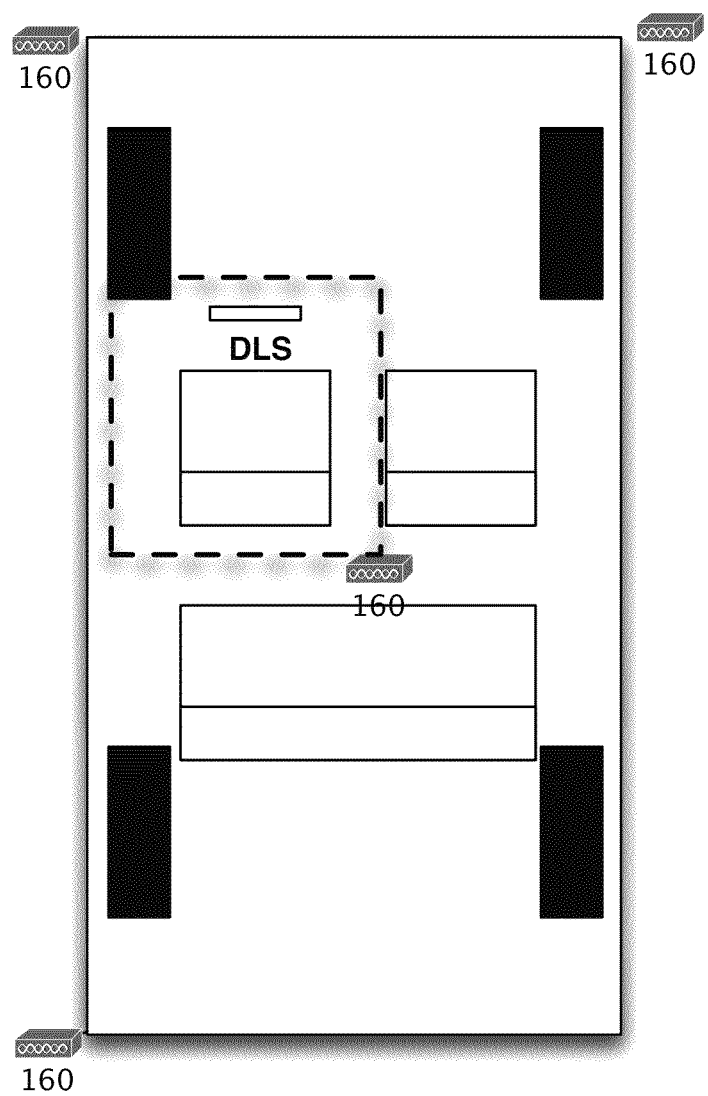
FIG. 23 illustrates an application for preventing drivers from sending or receiving calls or text messages from the driver's seat.

Turning now to FIG. 23, an application to improve traffic safety by preventing driver's from sending/or receiving calls or text messages from the driver's seat is described. The space around the driver's seat is prevented from making or receiving calls or texts via coordination with the terminal service provider. The passengers, not in the DLS designed to define the restricted use space, would have normal service. Note the center receiver shown in this two-dimensional drawing is off-plane (e.g. roof-mounted) to allow observation in three dimensions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for determining positioning of a wireless terminal comprising:
   determining positioning of a plurality of receivers capturing a first wireless signal emitted from the wireless terminal;
   determining a plurality of defined local spaces (DLSs), each DLS defining a volume among four receivers of the plurality of receivers;
   determining a plurality of points within each DLS, including spatially relating each point to the positioning of the four receivers defining the corresponding DLS;
   determining a four travel times for each point, each travel time representing time needed for wireless signals to travel from the corresponding point to a corresponding one of the four receivers defining the corresponding DLS;
   determining a first plurality of first arrival times, each first arrival time representing time for the first wireless signal to reach each of the plurality of receivers;
   determining the wireless terminal to be positioned within a first DLS of the plurality of DLSs, the first DLS being associated with the point having travel times most closely correlated with the first arrival times.

2. The method of claim 1 further comprising determining the plurality of DLS s to define tetrahedron-shaped volumes.

3. The method of claim 1 further comprising:
   determining a second plurality of second arrival times, each second arrival time representing time for a second signal to reach each of the plurality of receivers, the second signal being emitted from the wireless terminal after the first signal;
   determining the wireless terminal to be positioned within a second DLS of the plurality of DLSs when the point having travel times most closely correlated with the second arrival times is within the second DLS.

4. The method of claim 3 further comprising determining the plurality of DLS s such that the volume of the first DLS is entirely outside the volume of the second DLS.

5. The method of claim 3 further comprising determining the plurality of DLS s such that the volume of the first DLS adjoins the volume of the second DLS.

6. The method of claim 3 further comprising determining the plurality of DLS s such that the volume of the first DLS encompasses the volume of the second DLS.

7. The method of claim 1 further comprising determining each DLS such that the corresponding four receivers are at least a predefined distance apart from each other, the predefined distance being greater than a length of a wavelength of the first wireless signal.

8. The method of claim 1 further comprising determining the wireless terminal to be positioned within the first DLS without identifying personal information for a user associated with the wireless terminal.

9. A computer program product embedded in a non-transitory computer-readable medium having instructions stored thereon, the instructions being sufficient for use with a processor to facilitate determining positioning of a wireless terminal, the non-transitory comprising instructions sufficient for:
   determining a plurality of defined local spaces (DLS s), each DLS defining a volume amongst four receiver groupings, the four receiver groupings being selected from a plurality of receivers receiving a first wireless signal from the wireless terminal; determining a plurality of points within each DLS;
   determining four travel times for each point, each travel time representing time needed for the first wireless signal to travel from the corresponding point to a corresponding one of the four receivers defining the corresponding DLS;
   determining a first plurality of arrival times, each first arrival time representing relative time measured for the first wireless signal to reach each of the plurality of receivers;
   determining positioning of the wireless terminal to be within a first DLS of the plurality of DLSs based on a correlation of the travel times and the arrival times.

10. The computer program product of claim 9 further comprising instructions sufficient for determining the first DLS to correspond with the one of the DLSs including the point having travel times most closely correlated with the arrival times.

11. The computer program product of claim 10 further comprising instructions sufficient for determining the first arrival time for a first receiving one of the plurality receivers receiving the wireless signal to be zero and each of the other first arrival times to be greater than zero.

12. The computer program product of claim 10 further comprising instructions sufficient for:
   identifying a shortest four of the arrival times; and
   determining positioning of the wireless terminal without correlating the arrival times that are longer than the shortest four of the arrival travel times with the travel times.

13. The computer program product of claim 10 further comprising instructions sufficient for:
   determining a second plurality of second arrival times, each second arrival time representing relative time measured for a second signal to reach each of the plurality of receivers, the second signal being emitted from the wireless terminal after the first signal;
   determining the wireless terminal to be positioned within a second DLS of the plurality of DLSs when the point having travel times most closely correlated with the second arrival times is included within the second DLS.

14. The computer program product of claim 13 further comprising instructions sufficient for determining the plurality of DLSs such that the volume of the first DLS is entirely outside the volume of the second DLS.

15. The computer program product of claim 13 further comprising instructions sufficient for determining the plurality of DLSs such that the volume of the first DLS adjoins the volume of the second DLS and none of the DLS overlap.

16. The computer program product of claim 13 further comprising instructions sufficient for determining the plurality of DLSs such that the volume of the first DLS encompasses the volume of the second DLS.

17. The computer program product of claim 9 further comprising instructions sufficient for determining the DLS for groupings of four receivers where each receiver is no closer than a predefined distance to any one of the other four receivers within the corresponding DLS.

18. The computer program product of claim 17 further comprising instructions sufficient for determining the predefined distance to be greater than or equal to a wavelength of the first wireless signal.

19. The computer program product of claim 9 further comprising instructions sufficient for determining positioning of the wireless terminal without determining phase of the wireless signals being received at the plurality of receivers.

20. A system for determining positioning of a cellular phone, the cellular phone receiving a ping from a base station, the ping prompting the cellular phone to transmit an administrative signal, the base station requiring receipt of the administrative signal prior to connecting a phone call to the cellular phone, the system comprising:

a plurality of receivers configured to capture the administrative signal, the receivers being unable to listen to the phone call;
a position locating processor configured to determine a position of the cellular phone when the administrative signal is transmitted, the position locating processor configured to:
i) determine a plurality of defined local spaces (DLSs), each DLS defining a volume amongst four receiver groupings, the four receiver groupings being selected from the plurality of receivers receiving the administrative signal;
ii) determining a plurality of points within each DLS;
iii) determining travel times relative to each point, each travel time representing time needed for the administrative signal to travel from the corresponding point to one of the receivers of the corresponding DLS;
iv) determining a first plurality of arrival times, each first arrival time representing time measured for the administrative signal to reach each one of the plurality of receivers;
v) determining positioning of the wireless terminal to be within a first DLS of the plurality of DLSs based on a correlation of the travel times and the arrival times.

* * * * *